United States Patent
Peng et al.

(10) Patent No.: US 11,544,100 B2
(45) Date of Patent: *Jan. 3, 2023

(54) HARDWARE ACCELERATION METHOD AND RELATED DEVICE

(71) Applicant: Huawei Technologies Co., Ltd., Shenzhen (CN)

(72) Inventors: Jun Peng, Shanghai (CN); Zhan Peng, Shenzhen (CN); Xu Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/379,539

(22) Filed: Jul. 19, 2021

(65) Prior Publication Data

US 2022/0012082 A1 Jan. 13, 2022

Related U.S. Application Data

(63) Continuation of application No. 16/829,871, filed on Mar. 25, 2020, now Pat. No. 11,068,298, which is a
(Continued)

(51) Int. Cl.
*G06F 15/173* (2006.01)
*G06F 9/455* (2018.01)
(Continued)

(52) U.S. Cl.
CPC ........ *G06F 9/45558* (2013.01); *G06F 9/5077* (2013.01); *H04L 41/5048* (2013.01);
(Continued)

(58) Field of Classification Search
CPC .............................. G06F 9/45558; G06F 9/455
(Continued)

(56) References Cited

U.S. PATENT DOCUMENTS 10,205,719 B2 * 2/2019 Feng ................... H04L 12/6418
2006/0146057 A1 7/2006 Blythe
(Continued)

FOREIGN PATENT DOCUMENTS

CN 102685162 A 9/2012
CN 103699577 A 4/2014
(Continued)

OTHER PUBLICATIONS

"Network Functions Virtualisation Infrastructure Architecture Part 2: Use Cases," GS NFV INF 001-2 V0.3.0, total 39 pages, XP014227060 (Jul. 26, 2013).
(Continued)

*Primary Examiner* — Anthony Mejia
(74) *Attorney, Agent, or Firm* — Leydig, Voit & Mayer, Ltd.

(57) ABSTRACT

The present invention provides a hardware acceleration method and a communications system. The hardware acceleration method includes: sending, by a network functions virtualization orchestrator (NFVO), first request information to a virtualized infrastructure manager (VIM), wherein the first request information is configured to request the VIM to deploy the to-be-accelerated VNF onto a host in a management domain of the VIM, wherein a hardware resource of the host meets a requirement of the to-be-accelerated VNF, and the requirement of the to-be-accelerated VNF includes information indicating a type of a required hardware acceleration resource and a size of the required hardware acceleration resource in the to-be-accelerated VNF; receiving, by the VIM, the first request information from the NFVO; and deploying, by the VIM, the to-be-accelerated VNF onto the host in the management domain of the VIM.

12 Claims, 10 Drawing Sheets

Related U.S. Application Data continuation of application No. 15/817,264, filed on Nov. 19, 2017, now Pat. No. 10,620,986, which is a continuation of application No. PCT/CN2015/079274, filed on May 19, 2015.

(51) Int. Cl.
*G06F 9/50* (2006.01)
*H04L 41/5041* (2022.01)
*H04L 41/5054* (2022.01)
*H04L 41/12* (2022.01)

(52) U.S. Cl.
CPC .. *H04L 41/5054* (2013.01); *G06F 2009/4557* (2013.01); *G06F 2009/45579* (2013.01); *G06F 2009/45595* (2013.01); *H04L 41/12* (2013.01)

(58) Field of Classification Search
USPC ............................................... 709/224
See application file for complete search history.

(56) References Cited

U.S. PATENT DOCUMENTS

| | | | |
|---|---|---|---|
| 2013/0347009 A1 | 12/2013 | Hall | |
| 2014/0201374 A1 | 7/2014 | Ashwood-Smith et al. | |
| 2014/0317293 A1 | 10/2014 | Shatzkamer | |
| 2014/0317625 A1 | 10/2014 | Ichikawa et al. | |
| 2015/0082308 A1 | 3/2015 | Kiess et al. | |
| 2015/0326448 A1* | 11/2015 | Chaudhary | G06Q 30/04 705/40 |
| 2015/0326535 A1* | 11/2015 | Rao | H04L 41/5054 726/15 |
| 2015/0381423 A1* | 12/2015 | Xiang | H04L 41/0895 709/223 |
| 2016/0329965 A1* | 11/2016 | Cook | H04B 10/27 |
| 2016/0337206 A1* | 11/2016 | Bugenhagen | H04L 67/02 |
| 2017/0090980 A1* | 3/2017 | Martin | G06F 9/5066 |
| 2017/0187572 A1 | 6/2017 | Wu et al. | |
| 2017/0208147 A1* | 7/2017 | I'Anson | H04L 41/0896 |
| 2017/0257276 A1* | 9/2017 | Chou | H04L 41/0823 |
| 2018/0034781 A1* | 2/2018 | Jaeger | H04L 63/0263 |
| 2018/0060135 A1* | 3/2018 | Lacey | H04L 41/0803 |
| 2019/0116097 A1* | 4/2019 | Shimojou | H04W 28/18 |
| 2019/0238404 A1* | 8/2019 | Yao | H04L 41/0895 |
| 2019/0334777 A1* | 10/2019 | Chou | H04L 41/0823 |
| 2022/0109588 A1* | 4/2022 | Zeng | H04L 12/2898 |

FOREIGN PATENT DOCUMENTS

| | | |
|---|---|---|
| CN | 104050045 A | 9/2014 |
| CN | 104410672 A | 3/2015 |
| CN | 104699508 A | 6/2015 |
| JP | 2002055892 A | 2/2002 |
| JP | 2015056182 A | 3/2015 |
| RU | 91204 U1 | 1/2010 |
| RU | 2406128 C2 | 12/2010 |
| WO | 2012024508 A2 | 2/2012 |
| WO | 2013084332 A1 | 6/2013 |
| WO | 2015026373 A1 | 2/2015 |

OTHER PUBLICATIONS

"Network Function Virtualization (NFV) Management and Orchestration," GS NFV-MAN 001 V0.4.8, total 206 pages, XP014182231 (May 2014).

Mijumbi et al., "Network Function Virtualization: State-of-the-Art and Research Challenges," IEEE Communications Surveys and Tutorials, vol. 18, No. 1, First Quarter 2016, total 27 pages, Institute of Electrical and Electronics Engineers, New York, New York (2016).

1. U.S. Appl. No. 16/829,871, filed Mar. 25, 2020.
2. U.S. Appl. No. 15/817,264, filed Nov. 19, 2017.

Nobach et al.,"Open, Elastic Provisioning of Hardware Acceleration in NFV Environments," 2015 International Conference and Workshops on Networked Systems (NETSYS), U.S.A., IEEE, total 6 pages (Mar. 9, 2015).

"Network Functions Virtualisation (NFV); Architectural Framework," ETSI GS NFV 002 V1.1.1, total 21 pages (Oct. 2013).

"Network Functions Virtualisation (NFV): Management and Orchestration," ETSI GS NFV-MAN 001 V1.1.1, pp. 1-184 (Dec. 2014).

Bronstrin et al., "Uniform Handling and Abstraction of NFV Hardware Accelerators," IEEE Network, total 8 pages (May-Jun. 2015).

Nobach et al., "Open, Elastic Provisioning of Hardware Acceleration in NFV Environments," 2015 International Conference and Workshops on Networked Systems, total 5 pages (Mar. 9, 2015).

Nobach et al., "Open, Elastic Provisioning of Hardware Acceleration in NFV Environments," Netsys 2015 SDNFlex Workshop IEEE Transactions on Network and Service Management, total 24 pages (Mar. 27, 2015).

"Network Functions Virtualisation (NFV); Management and Orchestration; Functional Requirements Specification," ETSI GS NFV IFA 010 V0.3.1, total 27 pages (Apr. 2015).

"Network Functions Virtualisation (NFV); Infrastructure; Compute Domain," ETSI GS NFV-INF 003 V1.1.1, pp. 1-57, (Dec. 2014).

* cited by examiner

HARDWARE ACCELERATION METHOD AND RELATED DEVICE

CROSS-REFERENCE TO RELATED APPLICATIONS

This application is a continuation of U.S. patent application Ser. No. 16/829,871, filed on Mar. 25, 2020, which is a continuation of U.S. patent application Ser. No. 15/817,264, filed on Nov. 19, 2017, now U.S. Pat. No. 10,620,986, which is a continuation of International Application No. PCT/CN2015/079274, filed on May 19, 2015. All of the aforementioned patent applications are hereby incorporated by reference in their entireties.

TECHNICAL FIELD

Embodiments of the present invention relates to the field of cloud computing, and in particular, to a hardware acceleration method and a related device.

BACKGROUND

Cloud computing is to distribute a computing task to distributed virtual computing resources, so that an enterprise or a user can switch the resources to different required applications by using a network central data center, to access different computer and storage systems as required. Cloud computing is a result of development and convergence of conventional computer and network technologies such as distributed computing, parallel computing, utility computing, network storage, virtualization, and load balance.

A cloud computing system, as a very complicated large software system, includes many modules and components. A cloud architecture falls into two major parts in total: service and management. In terms of service, the cloud architecture mainly provide a user with various cloud-based services, which include three layers in total. The first layer is software as a service (SaaS), and a function of this layer is to provide an application for a client mainly in a Web-based manner; the second layer is platform as a service (PaaS), and a function of this layer is to provide a development and deployment platform as a service for a user; the third layer is infrastructure as a service (IaaS), and a function of this layer is to provide various bottom-layer resources such as a computing resource (for example, a virtual machine) and a storage resource as a service for a user. From the perspective of a user, services at the three layers are independent, because the services provided by the three layers are completely different, and are not intended for same users. However, from a technological perspective, there is a particular dependency among the three layers of the cloud service. For example, a product and service of the SaaS layer not only require a technology of the SaaS layer, but also depend on the development and deployment platform provided by the PaaS layer, or are directly deployed on the computing resource provided by the IaaS layer; and a product and service of the PaaS layer are also likely to be constructed on a service of the IaaS layer. A management aspect mainly involves a cloud management layer, and its function is to ensure that the entire cloud computing system can run safely and stably and can be effectively managed.

As cloud computing technologies gradually mature, IT and CT fields converge and are integrated. To cope with future competition and challenges, CT operators comply with a current technology development trend of virtualization and cloud computing, and propose a network functions virtualization (NFV) architecture in an ICT field. Reference may be made to FIG. 1 for a schematic structural diagram of the architecture. In the new architecture, functional objects such as a network functions virtualization infrastructure (NFVI), a virtualized infrastructure manager VIM, a virtualized network function manager (VNFM), a network functions virtualization orchestrator (NFVO), and a virtualized network function VNF are defined. The NFVI provides a cloudified infrastructure layer, the VNF is a cloudified network element application, the virtualized infrastructure manager VIM is responsible for infrastructure layer management, the VNFM is responsible for VNF lifecycle management, and the NFVO is responsible for service lifecycle management. An E/NMS is a network management system of a conventional CT telecommunications network element; an OSS/BSS is a network management system of a cloud system. Deployment and operation behaviors for each VNF are described by using a VNFD template and stored in a VNF catalog.

An NFVI resource is allocated to a VNF based on a requirement described in a VNFD and in consideration of a specific requirement, a constraint, and a strategy that are preset. As telecommunications services increase, in an architecture of NFV MANO, operators recognize that an accelerator is a key element of the NFVI, and is as important as a CPU, a network interface card (NIC), and a memory. The NFV MANO is a unit including at least the NFVO, the VNF, the VNF catalog, and the VIM. According to a prediction in the industry on data traffic in a next decade (increasing by 100 to 200 times), it is conservatively estimated that a capability of a single server in the future needs to be increased by 10 times without considering factors such as an increase in a device scale, and this is also a capability demand for each CPU. By means of data platform development kit (DPDK) optimization, software performance optimization, and the like, the capability can be improved by a maximum of 4 to 5 times, which is far from achieving the server capability demand. The entire industry actively tries to resolve such a huge performance difference by means of System-on-a-Chip (SOC), hardware acceleration, and the like.

In an existing architecture, the MANO knows nothing about a situation about a to-be-accelerated resource in the VNF and an acceleration unit of a Host. In the prior art, in a process of deploying a VNF onto a Host, the VNF is randomly or sequentially deployed onto a Host of each DC. In a solution in the prior art, a type of a resource that needs to be accelerated in the VNF cannot match a type of an acceleration resource that can be provided by the Host of the VNF; therefore, it is liable that a type of a to-be-accelerated resource in the VNF does not match a type of an acceleration resource of a host onto which the VNF is deployed, so that the acceleration resource of the Host in which the VNF is located cannot meet an acceleration requirement of the VNF, thereby deteriorating performance of the VNF.

SUMMARY

Embodiments of the present invention provides a hardware acceleration method and a related device.

A first aspect of embodiments of the present invention provides a hardware acceleration method, including:

determining, by a functional entity, a type and a size of a required hardware acceleration resource in a to-be-accelerated virtualized network function VNF in a management domain of the functional entity;

determining, by the functional entity, a target virtualized infrastructure manager VIM; and deploying, by the functional entity, the to-be-accelerated VNF onto a target host in a management domain of the target VIM by using the target VIM, where a size of a hardware matching resource of the target host is greater than the size of the hardware acceleration resource required in the to-be-accelerated VNF, and a type of the hardware matching resource is consistent with the type of the required hardware acceleration resource.

With reference to the first aspect of the embodiments of the present invention, in a first implementation manner of the first aspect of the embodiments of the present invention, wherein the functional entity is a network functions virtualization orchestrator NFVO, the determining, by a functional entity, a type and a size of a required hardware acceleration resource in a to-be-accelerated virtualized network function VNF in a management domain of the functional entity includes:

determining, by the NFVO, a type and a size of a hardware acceleration resource required in a to-be-accelerated VNF in a management domain of the NFVO according to a target field in a VNF descriptor template corresponding to the to-be-accelerated VNF.

With reference to the first implementation manner of the first aspect of the embodiments of the present invention, in a second implementation manner of the first aspect of the embodiments of the present invention, the determining, by the functional entity, a target virtualized infrastructure manager VIM includes:

receiving, by the NFVO, hardware acceleration information sent by each VIM in the management domain of the NFVO, where the hardware acceleration information includes a reported hardware matching resource size, and the reported hardware matching resource size is a size of a hardware matching resource of a host that is in a management domain of each VIM and that has a largest hardware matching resource;

determining, by the NFVO, a size of a target hardware matching resource, where the size of the target hardware matching resource is a maximum value in the reported hardware matching resource sizes;

determining, by the NFVO, that a host corresponding to the size of the target hardware matching resource is the target host; and determining, by the NFVO, that a VIM corresponding to the target host is the target VIM.

With reference to the first implementation manner of the first aspect of the embodiments of the present invention or the second implementation manner of the first aspect of the embodiments of the present invention, in a third implementation manner of the first aspect of the embodiments of the present invention, the deploying, by the functional entity, the to-be-accelerated VNF onto a target host in a management domain of the target VIM by using the target VIM includes:

sending, by the NFVO, first request information to the target VIM, where the first request information is used to make the target VIM deploy the to-be-accelerated VNF onto the target host in the management domain of the target VIM;
or sending, by the NFVO, first indication information to a virtualized network function manager VNFM, where the first indication information is used to make the VNFM send a second request message to the target VIM, and the second request information is used to make the target VIM deploy the to-be-accelerated VNF onto the target host in the management domain of the target VIM.

With reference to the first implementation manner of the first aspect of the embodiments of the present invention, in a fourth implementation manner of the first aspect of the embodiments of the present invention, wherein the functional entity is a virtualized network function manager VNFM, the determining, by a functional entity, a type and a size of a required hardware acceleration resource in a to-be-accelerated virtualized network function VNF in a management domain of the functional entity includes:

determining, by the VNFM, a type and a size of a hardware acceleration resource required in a to-be-accelerated VNF in a management domain of the NFVO according to a target field in a VNF descriptor template corresponding to the to-be-accelerated VNF; and after the determining, by a functional entity, a type and a size of a required hardware acceleration resource in a to-be-accelerated virtualized network function VNF in a management domain of the functional entity, the method further includes:

sending, by the VNFM, the type and the size of the hardware acceleration resource required in the to-be-accelerated VNF to the NFVO.

With reference to the fourth implementation manner of the first aspect of the embodiments of the present invention, in a fifth implementation manner of the first aspect of the embodiments of the present invention, the determining, by the functional entity, a target virtualized infrastructure manager VIM includes:

sending, by the VNFM, third request information to the NFVO, so that the NFVO determines the target VIM according to the third request information and the type and the size of the hardware acceleration resource required in the to-be-accelerated VNF; and the deploying, by the functional entity, the to-be-accelerated VNF onto a target host in a management domain of the target VIM by using the target VIM includes:

receiving, by the VNFM, second indication information sent by the NFVO, where the second indication information is used to indicate the target VIM; and sending, by the VNFM, fourth request information to the target VIM according to the second indication information, where the fourth request information is used to make the target VIM deploy the to-be-accelerated VNF onto the target host in the management domain of the target VIM.

A second aspect of embodiments of the present invention provides a hardware acceleration method, including:

sending, by a target virtualized infrastructure manager VIM, a size of a hardware matching resource of a target host in a management domain of the target VIM to a functional entity, so that the functional entity determines the target VIM according to the size of the hardware matching resource of the target host, where, in addition, the functional entity is further configured to determine a type and a size of a required hardware acceleration resource in a to-be-accelerated virtualized network function VNF in a management domain of the functional entity; and deploying, by the target VIM, the to-be-accelerated VNF onto the target host in the management domain of the target VIM under the control of the functional entity, where the size of the hardware matching resource of the target host is greater than the size of the hardware acceleration resource required in the to-be-accelerated VNF, and a type of the hardware matching resource is consistent with the type of the required hardware acceleration resource.

With reference to the second aspect of the embodiments of the present invention, in a first implementation manner of the second aspect of the embodiments of the present invention, wherein the functional entity is a network functions virtualization orchestrator NFVO, the sending, by a target virtualized infrastructure manager VIM, a size of a hardware matching resource of a target host in a management domain of the target VIM to a functional entity includes:

sending, by the target VIM, hardware acceleration information to the NFVO, where the hardware acceleration information includes a reported hardware matching resource size, and the reported hardware matching resource size is a size of a hardware matching resource of a target host that is in the management domain of the target VIM and that has a largest hardware matching resource, so that the NFVO determines a size of a target hardware matching resource according to the hardware acceleration information, where the size of the target hardware matching resource is a maximum value in reported hardware matching resource sizes of VIMs in a management domain of the NFVO, so that the NFVO determines that a host corresponding to the size of the target hardware matching resource is the target host, and the NFVO determines that a VIM corresponding to the target host is the target VIM.

With reference to the first implementation manner of the second aspect of the embodiments of the present invention, in a second implementation manner of the second aspect of the embodiments of the present invention, the deploying, by the target VIM, the to-be-accelerated VNF onto the target host in the management domain of the target VIM under the control of the functional entity includes:

receiving, by the target VIM, first request information sent by the NFVO; and deploying, by the target VIM, the to-be-accelerated VNF onto the target host in the management domain of the target VIM according to the first request information;

or receiving, by the target VIM, a second request message sent by a virtualized network function manager VNFM, where the VNFM is configured to receive first indication information sent by the NFVO, and the first indication information is used to make the VNFM send the second request message to the target VIM; and deploying, by the target VIM, the to-be-accelerated VNF onto the target host in the management domain of the target VIM according to the second request message.

With reference to the second aspect of the embodiments of the present invention, in a third implementation manner of the second aspect of the embodiments of the present invention, wherein the functional entity is a virtualized network function manager VNFM, the deploying, by the target VIM, the to-be-accelerated VNF onto the target host in the management domain of the target VIM under the control of the functional entity includes:

receiving, by the target VIM, fourth request information sent by the VNFM, where the VNFM is configured to send the fourth request information to the target VIM according to second indication information, the VNFM is further configured to receive the second indication information sent by the NFVO, and the second indication information is used to indicate the target VIM; and deploying, by the target VIM, the to-be-accelerated VNF onto the target host in the management domain of the target VIM according to the fourth request information.

A third aspect of embodiments of the present invention provides a functional entity, including:

a first determining unit, configured to determine a type and a size of a required hardware acceleration resource in a to-be-accelerated virtualized network function VNF in a management domain of the functional entity;

a second determining unit, configured to determine a target virtualized infrastructure manager VIM; and a first deployment unit, configured to deploy the to-be-accelerated VNF onto a target host in a management domain of the target VIM by using the target VIM, where a size of a hardware matching resource of the target host is greater than the size of the hardware acceleration resource required in the to-be-accelerated VNF, and a type of the hardware matching resource is consistent with the type of the required hardware acceleration resource.

With reference to the third aspect of the embodiments of the present invention, in a first implementation manner of the third aspect of the embodiments of the present invention, wherein the functional entity is a network functions virtualization orchestrator NFVO, the first determining unit includes:

the first determining unit is further configured to determine a type and a size of a hardware acceleration resource required in a to-be-accelerated VNF in a management domain of the NFVO according to a target field in a VNF descriptor template corresponding to the to-be-accelerated VNF.

With reference to the first implementation manner of the third aspect of the embodiments of the present invention, in a second implementation manner of the third aspect of the embodiments of the present invention, the second determining unit includes:

a first receiving module, configured to receive hardware acceleration information sent by each VIM in the management domain of the NFVO, where the hardware acceleration information includes a reported hardware matching resource size, and the reported hardware matching resource size is a size of a hardware matching resource of a host that is in a management domain of each VIM and that has a largest hardware matching resource;

a first determining module, configured to determine a size of a target hardware matching resource, where the size of the target hardware matching resource is a maximum value in the reported hardware matching resource sizes;

a second determining module, configured to determine that a host corresponding to the size of the target hardware matching resource is the target host; and a third determining module, configured to determine that a VIM corresponding to the target host is the target VIM.

With reference to the first implementation manner of the third aspect of the embodiments of the present invention or the second implementation manner of the third aspect of the embodiments of the present invention, in a third implementation manner of the third aspect of the embodiments of the present invention, the first deployment unit includes:

a first sending module, configured to send first request information to the target VIM, where the first request information is used to make the target VIM deploy the to-be-accelerated VNF onto the target host in the management domain of the target VIM;

or a second sending module, configured to send first indication information to a virtualized network function manager VNFM, where the first indication information is used to make the VNFM send a second request message to the target VIM, and the second request information is used to make the target VIM deploy the to-be-accelerated VNF onto the target host in the management domain of the target VIM.

With reference to the third aspect of the embodiments of the present invention, in a fourth implementation manner of the third aspect of the embodiments of the present invention, wherein the functional entity is a virtualized network function manager VNFM, the first determining unit is further configured to determine a type and a size of a hardware acceleration resource required in a to-be-accelerated VNF in a management domain of the NFVO according to a target field in a VNF descriptor template corresponding to the to-be-accelerated VNF; and the functional entity further includes:

a first sending unit, configured to send the type and the size of the hardware acceleration resource required in the to-be-accelerated VNF to the NFVO.

With reference to the fourth implementation manner of the third aspect of the embodiments of the present invention, in a fifth implementation manner of the third aspect of the embodiments of the present invention, the second determining unit is further configured to send third request information to the NFVO, so that the NFVO determines the target VIM according to the third request information and the type and the size of the hardware acceleration resource required in the to-be-accelerated VNF; and the first deployment unit includes:

a second receiving module, configured to receive second indication information sent by the NFVO, where the second indication information is used to indicate the target VIM; and a third sending module, configured to send fourth request information to the target VIM according to the second indication information, where the fourth request information is used to make the target VIM deploy the to-be-accelerated VNF onto the target host in the management domain of the target VIM.

A fourth aspect of embodiments of the present invention provides a target virtualized infrastructure manager VIM, including:

a second sending unit, configured to send a size of a hardware matching resource of a target host in a management domain of the target VIM to a functional entity, so that the functional entity determines the target VIM according to the size of the hardware matching resource of the target host, where, in addition, the functional entity is further configured to determine a type and a size of a required hardware acceleration resource in a to-be-accelerated virtualized network function VNF in a management domain of the functional entity; and a second deployment unit, configured to deploy the to-be-accelerated VNF onto the target host in the management domain of the target VIM under the control of the functional entity, where the size of the hardware matching resource of the target host is greater than the size of the hardware acceleration resource required in the to-be-accelerated VNF, and a type of the hardware matching resource is consistent with the type of the required hardware acceleration resource.

With reference to the fourth aspect of the embodiments of the present invention, in a first implementation manner of the fourth aspect of the embodiments of the present invention, wherein the functional entity is a network functions virtualization orchestrator NFVO, the second sending unit is further configured to send hardware acceleration information to the NFVO, where the hardware acceleration information includes a reported hardware matching resource size, and the reported hardware matching resource size is a size of a hardware matching resource of a target host that is in the management domain of the target VIM and that has a largest hardware matching resource, so that the NFVO determines a size of a target hardware matching resource according to the hardware acceleration information, where the size of the target hardware matching resource is a maximum value in reported hardware matching resource sizes of VIMs in a management domain of the NFVO, so that the NFVO determines that a host corresponding to the size of the target hardware matching resource is the target host, and the NFVO determines that a VIM corresponding to the target host is the target VIM.

With reference to the first implementation manner of the fourth aspect of the embodiments of the present invention, in a second implementation manner of the fourth aspect of the embodiments of the present invention, the second deployment unit includes:

a third receiving module, configured to receive first request information sent by the NFVO; and a first deployment module, configured to deploy the to-be-accelerated VNF onto the target host in the management domain of the target VIM according to the first request information;

or a fourth receiving module, configured to receive a second request message sent by a virtualized network function manager VNFM, where the VNFM is configured to receive first indication information sent by the NFVO, and the first indication information is used to make the VNFM send the second request message to the target VIM; and a second deployment module, configured to deploy the to-be-accelerated VNF onto the target host in the management domain of the target VIM according to the second request message.

With reference to the fourth aspect of the embodiments of the present invention, in a third implementation manner of the fourth aspect of the embodiments of the present invention, wherein the functional entity is a virtualized network function manager VNFM, the second deployment unit includes:

a fifth receiving module, configured to receive fourth request information sent by the VNFM, where the VNFM is configured to send the fourth request information to the target VIM according to second indication information, the VNFM is further configured to receive the second indication information sent by the NFVO, and the second indication information is used to indicate the target VIM; and a third deployment module, configured to deploy the to-be-accelerated VNF onto the target host in the management domain of the target VIM according to the fourth request information.

A fifth aspect of embodiments of the present invention provides a functional entity, including: a transmitter, a receiver, and a processor, where the processor is configured to perform the following operations:

determining a type and a size of a required hardware acceleration resource in a to-be-accelerated virtualized network function VNF in a management domain of the functional entity;

determining a target virtualized infrastructure manager VIM; and deploying the to-be-accelerated VNF onto a target host in a management domain of the target VIM by using the target VIM, where a size of a hardware matching resource of the target host is greater than the size of the hardware acceleration resource required in the to-be-accelerated VNF, and a type of the hardware matching resource is consistent with the type of the required hardware acceleration resource.

With reference to the fifth aspect of the embodiments of the present invention, in a first implementation manner of the fifth aspect of the embodiments of the present invention, wherein the functional entity is a network functions virtualization orchestrator NFVO, the processor is further configured to perform the following operation:

determining a type and a size of a hardware acceleration resource required in a to-be-accelerated VNF in a management domain of the NFVO according to a target field in a VNF descriptor template corresponding to the to-be-accelerated VNF.

With reference to the first implementation manner of the fifth aspect of the embodiments of the present invention, in a second implementation manner of the fifth aspect of the embodiments of the present invention, the receiver is configured to perform the following operation:

receiving hardware acceleration information sent by each VIM in the management domain of the NFVO, where the hardware acceleration information includes a reported hardware matching resource size, and the reported hardware matching resource size is a size of a hardware matching resource of a host that is in a management domain of each VIM and that has a largest hardware matching resource; and the processor is further configured to perform the following operations:

determining a size of a target hardware matching resource, where the size of the target hardware matching resource is a maximum value in the reported hardware matching resource sizes;

determining that a host corresponding to the size of the target hardware matching resource is the target host; and determining that a VIM corresponding to the target host is the target VIM.

With reference to the first implementation manner of the fifth aspect of the embodiments of the present invention or the second implementation manner of the fifth aspect of the embodiments of the present invention, in a third implementation manner of the fifth aspect of the embodiments of the present invention, the transmitter is configured to perform the following operation:

sending first request information to the target VIM, where the first request information is used to make the target VIM deploy the to-be-accelerated VNF onto the target host in the management domain of the target VIM;

or sending first indication information to a virtualized network function manager VNFM, where the first indication information is used to make the VNFM send a second request message to the target VIM, and the second request information is used to make the target VIM deploy the to-be-accelerated VNF onto the target host in the management domain of the target VIM.

With reference to the fifth aspect of the embodiments of the present invention, in a fourth implementation manner of the fifth aspect of the embodiments of the present invention, wherein the functional entity is a virtualized network function manager VNFM, the processor is further configured to perform the following operation:

determining a type and a size of a hardware acceleration resource required in a to-be-accelerated VNF in a management domain of the NFVO according to a target field in a VNF descriptor template corresponding to the to-be-accelerated VNF; and the transmitter is configured to perform the following operation:

sending the type and the size of the hardware acceleration resource required in the to-be-accelerated VNF to the NFVO.

With reference to the fourth implementation manner of the fifth aspect of the embodiments of the present invention, in a fifth implementation manner of the fifth aspect of the embodiments of the present invention, the transmitter is further configured to perform the following operation:

sending third request information to the NFVO, so that the NFVO determines the target VIM according to the third request information and the type and the size of the hardware acceleration resource required in the to-be-accelerated VNF;

the receiver is further configured to perform the following operation:

receiving second indication information sent by the NFVO, where the second indication information is used to indicate the target VIM; and the transmitter is further configured to perform the following operation:

sending fourth request information to the target VIM according to the second indication information, where the fourth request information is used to make the target VIM deploy the to-be-accelerated VNF onto the target host in the management domain of the target VIM.

A sixth aspect of embodiments of the present invention provides a target virtualized infrastructure manager VIM, including: a transmitter, a receiver, and a processor, where the transmitter is configured to perform the following operation:

sending a size of a hardware matching resource of a target host in a management domain of the target VIM to a functional entity, so that the functional entity determines the target VIM according to the size of the hardware matching resource of the target host, where, in addition, the functional entity is further configured to determine a type and a size of a required hardware acceleration resource in a to-be-accelerated virtualized network function VNF in a management domain of the functional entity; and the processor is configured to perform the following operation:

deploying the to-be-accelerated VNF onto the target host in the management domain of the target VIM under the control of the functional entity, where the size of the hardware matching resource of the target host is greater than the size of the hardware acceleration resource required in the to-be-accelerated VNF, and a type of the hardware matching resource is consistent with the type of the required hardware acceleration resource.

With reference to the sixth aspect of the embodiments of the present invention, in a first implementation manner of the sixth aspect of the embodiments of the present invention, wherein the functional entity is a network functions virtualization orchestrator NFVO, the transmitter is further configured to perform the following operation:

sending hardware acceleration information to the NFVO, where the hardware acceleration information includes a reported hardware matching resource size, and the reported hardware matching resource size is a size of a hardware matching resource of a target host that is in the management domain of the target VIM and that has a largest hardware matching resource, so that the NFVO determines a size of a target hardware matching resource according to the hardware acceleration information, where the size of the target hardware matching resource is a maximum value in reported hardware matching resource sizes of VIMs in a management domain of the NFVO, so that the NFVO determines that a host corresponding to the size of the target hardware matching resource is the target host, and the NFVO determines that a VIM corresponding to the target host is the target VIM.

With reference to the first implementation manner of the sixth aspect of the embodiments of the present invention, in a second implementation manner of the sixth aspect of the embodiments of the present invention, the receiver is configured to perform the following operation:

receiving first request information sent by the NFVO; and the processor is configured to perform the following operation:

deploying the to-be-accelerated VNF onto the target host in the management domain of the target VIM according to the first request information;

or the receiver is further configured to perform the following operation:

receiving a second request message sent by a virtualized network function manager VNFM, where the VNFM is configured to receive first indication information sent by the NFVO, and the first indication information is used to make the VNFM send the second request message to the target VIM; and the processor is further configured to perform the following operation:

deploying the to-be-accelerated VNF onto the target host in the management domain of the target VIM according to the second request message.

With reference to the sixth aspect of the embodiments of the present invention, in a third implementation manner of the sixth aspect of the embodiments of the present invention, wherein the functional entity is a virtualized network function manager VNFM, the receiver is further configured to perform the following operation:

receiving fourth request information sent by the VNFM, where the VNFM is configured to send the fourth request information to the target VIM according to second indication information, the VNFM is further configured to receive the second indication information sent by the NFVO, and the second indication information is used to indicate the target VIM; and the processor is configured to perform the following operation:

deploying the to-be-accelerated VNF onto the target host in the management domain of the target VIM according to the fourth request information.

The present invention provides a hardware acceleration method and a related device. The hardware acceleration method includes: determining, by a functional entity, a type and a size of a required hardware acceleration resource in a to-be-accelerated virtualized network function VNF in a management domain of the functional entity; determining, by the functional entity, a target virtualized infrastructure manager VIM; and deploying, by the functional entity, the to-be-accelerated VNF onto a target host in a management domain of the target VIM by using the target VIM. In this embodiment, a size of a hardware matching resource of the target host is greater than the size of the hardware acceleration resource required in the to-be-accelerated VNF, and a type of the hardware matching resource is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, so that the hardware matching resource of the target host can meet an acceleration requirement of the to-be-accelerated VNF, thereby effectively improving performance of the to-be-accelerated VNF.

DESCRIPTION OF EMBODIMENTS

An embodiment of the present invention provides a hardware acceleration method, and the hardware acceleration method enables an acceleration resource of a host in which a VNF is located to meet an acceleration requirement of the VNF.

In the following, the hardware acceleration method provided in this embodiment is described in detail with reference to FIG. 2, and the hardware acceleration method includes:

201. A functional entity determines a type and a size of a required hardware acceleration resource in a to-be-accelerated virtualized network function VNF in a management domain of the functional entity.

Figure 3:
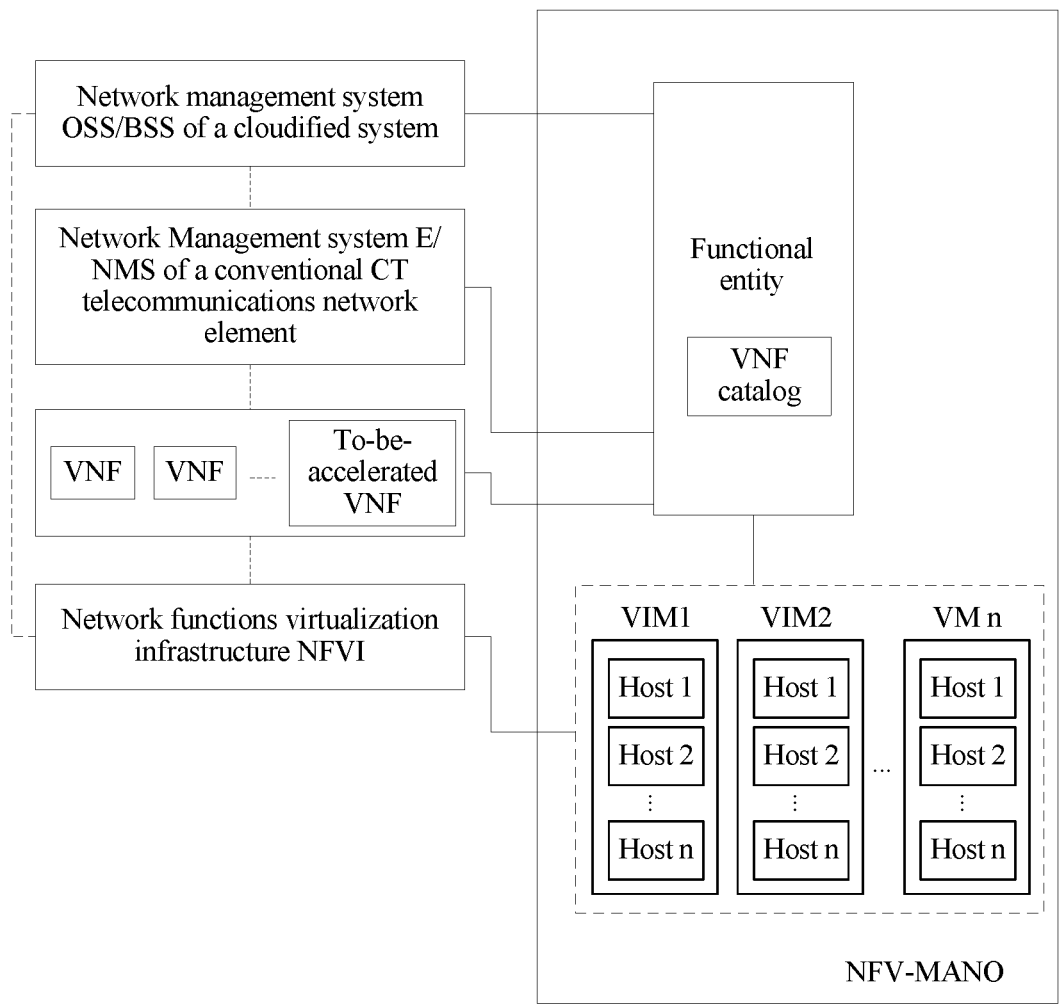
FIG. 3 is a schematic structural diagram of an embodiment of a network functions virtualization architecture according to an embodiment of the present invention.

For a structure of a network functions virtualization architecture provided in this embodiment, refer to FIG. 3. A specific implementation structure of the functional entity is not limited in this embodiment.

It can be learnt from FIG. 3 that, the management domain of the functional entity includes multiple VNFs, and the functional entity can create a VNF instance by using a VNF descriptor (VNFD), and manage lifecycles of these instances, where deployment and operation behaviors for each VNF are described by using a VNFD template and stored in a VNF catalog.

In addition, a VNFD and a VNF are in a one-to-one correspondence, and the VNFD fully describes a feature and a requirement necessary for implementing the VNF.

The functional entity can determine, by reading each VNFD, a to-be-accelerated VNF that requires hardware acceleration in each VNF in the management domain of the functional entity, and can determine a type and a size of a hardware acceleration resource required in the to-be-accelerated VNF by reading a VNFD corresponding to the to-be-accelerated VNF.

A specific implementation manner of the VNFD is not limited in this embodiment provided that the VNFD can fully describe a feature and a requirement necessary for each VNF in the management domain of the functional entity, that is, provided that the functional entity can determine a requirement of the to-be-accelerated VNF by reading the VNFD, where the requirement of the to-be-accelerated VNF includes but is not limited to the type, the size, compatibility, performance, and the like of the hardware acceleration resource required in the to-be-accelerated VNF.

For details about a network management system OSS/BSS of a cloud system, a network management system E/NMS of a conventional CT telecommunications network element, and a network functions virtualization infrastructure NFVI that are in the network functions virtualization architecture shown in FIG. 3, refer to the prior art. Details are not described in this embodiment again.

A specific type of the hardware acceleration resource is not limited in this embodiment. For example, the hardware acceleration resource may be any hardware resource that requires acceleration such as a video acceleration resource.

202. The functional entity determines a target virtualized infrastructure manager VIM.

The functional entity determines that a VIM, in multiple VIMs in the management domain of the functional entity, that meets a preset condition is the target VIM, so that the target VIM determines a target host in a management domain of the target VIM.

The preset condition is that the target host exists in the management domain of the target VIM.

Specifically, a size of a hardware matching resource of the target host is greater than the size of the hardware acceleration resource required in the to-be-accelerated VNF.

More specifically, a type of the hardware matching resource is consistent with the type of the required hardware acceleration resource.

203. The functional entity deploys the to-be-accelerated VNF onto a target host in a management domain of the target VIM by using the target VIM.

The functional entity deploys the to-be-accelerated VNF onto the target host in the management domain of the target VIM by using the determined target VIM.

In this embodiment, in a process in which the functional entity deploys the to-be-accelerated VNF onto the host, deployment is not performed sequentially or randomly, but the functional entity deploys the to-be-accelerated VNF onto the target host whose hardware matching resource has a greater size than the size of the hardware acceleration resource required in the to-be-accelerated VNF, and the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

In the following, an implementation manner in which the functional entity specifically determines the target VIM is described in detail with reference to FIG. 4. It should be noted that, the following description of how to determine the target VIM is an example, and the present invention is not limited thereto provided that the to-be-accelerated VNF can be deployed onto the target host.

Figure 5:
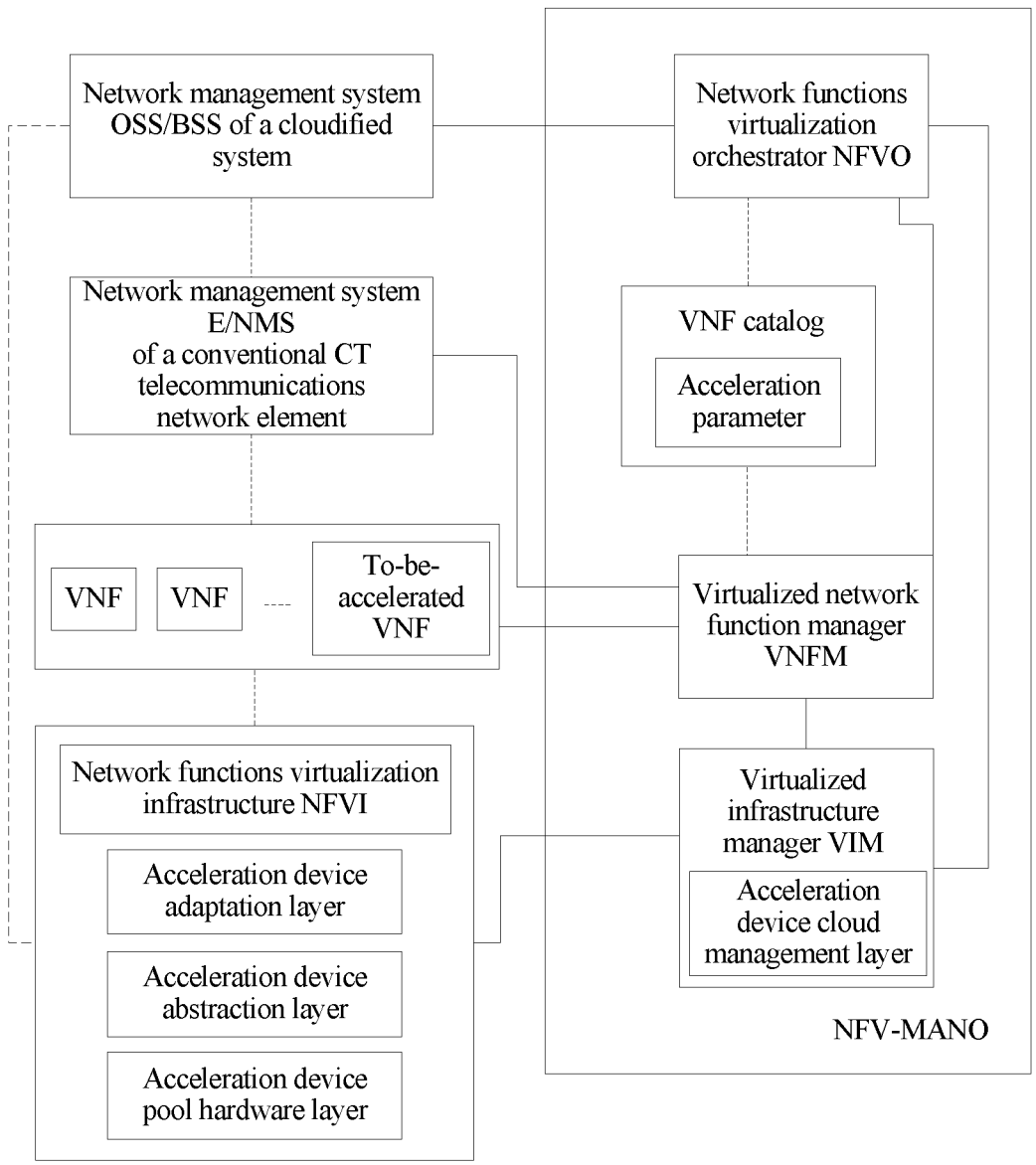
FIG. 5 is a schematic structural diagram of another embodiment of a network functions virtualization architecture according to an embodiment of the present invention.

In this embodiment, reference may be made to FIG. 5 for a specific structure of the network functions virtualization architecture, and this embodiment is described by assuming that the functional entity is a network functions virtualization orchestrator NFVO.

401. An NFVO determines a type and a size of a hardware acceleration resource required in a to-be-accelerated VNF in a management domain of the NFVO according to a target field in a VNF descriptor template corresponding to the to-be-accelerated VNF.

Specifically, as shown in FIG. 5, the NFVO acquires, by reading a VNFD template in a VNF catalog, the type and the size of the hardware acceleration resource required in the to-be-accelerated VNF that requires hardware acceleration in the management domain of the NFVO.

Deployment and operation behaviors for each VNF are described by using a VNFD template and stored in a VNF catalog, and a VNFD and a VNF are in a one-to-one correspondence. Therefore, in this embodiment, the NFVO can acquire, by reading a VNFD corresponding to the to-be-accelerated VNF that requires hardware acceleration, the type and the size of the hardware acceleration resource required in the to-be-accelerated VNF that requires hardware acceleration.

In the following, how the VNFD template in the VNF catalog describes the type and the size of the hardware acceleration resource required in the to-be-accelerated VNF is described by using an example. It should be noted that, the following is merely an example of the VNFD template, and the present invention is not limited thereto.

A target field vdu is set in the VNFD template in the VNF catalog, and the target field vdu is shown in Table 1.

TABLE 1

| Identifier | Cardinality | Description |
| --- | --- | --- |
| Vdu | 1 ... N | A virtualization deployment unit, equivalent to a virtual machine before instantiation |

In this embodiment, a parameter of a hardware accelerator is added to the target field vdu, and details are shown in Table 2.

TABLE 2

| Identifier | Cardinality | Description |
| --- | --- | --- |
| resource_support_accelerator | 1 ... N | The parameter can be directly called by NFV-MANO, and a type and a size of a hardware acceleration resource, a chipset of an accelerator framework of the resource, and a drive program of the chipset are defined at an NFVI layer |

That is, in this embodiment, the NFVO acquires the parameter of the hardware accelerator by reading the target field in the VNFD template corresponding to the to-be-accelerated VNF, and then can determine the type and the size of the hardware acceleration resource in the to-be-accelerated VNF.

The hardware accelerator may be in a form of specific hardware or chip, which is not specifically limited in this embodiment.

Specifically, as shown in FIG. 5, an NFVI includes but is not limited to:

an acceleration device adaptation layer, used to provide a unified adaptation framework for a service;

an acceleration device abstraction layer, used to perform operations such as installation, startup, monitoring, and manager deployment on a server node acceleration device; and an acceleration device pool hardware layer, at which acceleration hardware is disposed, including an FPGA, a southbridge chip, a processor-related acceleration SoC, and corresponding physical and virtual drivers.

402. The NFVO receives hardware acceleration information sent by each VIM in the management domain of the NFVO.

The hardware acceleration information includes a reported hardware matching resource size.

The reported hardware matching resource size is a size of a hardware matching resource of a host that is in a management domain of each VIM and that has a largest hardware matching resource.

403. The NFVO determines a size of a target hardware matching resource.

The size of the target hardware matching resource is a maximum value in the reported hardware matching resource sizes.

404. The NFVO determines that a host corresponding to the size of the target hardware matching resource is a target host.

405. The NFVO determines that a VIM corresponding to the target host is a target VIM.

It can be learnt from step 402 to step 405 that, in this embodiment, that the NFVO determines that the VIM with the maximum value in the reported hardware matching resource sizes in the management domain of the NFVO is the target VIM is an example of determining the target VIM, and the present invention is not limited thereto. Another manner of determining the target VIM may also be used provided that the type of the hardware acceleration resource required in the to-be-accelerated VNF can match a type of the hardware matching resource of the target host and the size of the hardware matching resource of the target host is greater than the size of the hardware acceleration resource required in the to-be-accelerated VNF.

Specifically, the NFVO determines the hardware acceleration information of each VIM in the management domain of the NFVO according to the determined type of the hardware acceleration resource required in the to-be-accelerated VNF.

Specifically, as shown in FIG. 5, at least an acceleration device cloud management layer is disposed in the VIM, where the acceleration device cloud management layer is a cloud management system for an acceleration device, and the cloud management system is used to allocate and deploy resources.

More specifically, the acceleration device cloud management layer of the VIM determines a size of a hardware matching resource of a host that is in a management domain of the VIM and that has a largest hardware matching resource, so that the VIM can report, to the NFVO, the size of the hardware matching resource of the host that is in the management domain of the VIM and that has the largest hardware matching resource.

406. The NFVO generates first request information.

The first request information is used by the NFVO to instruct the target VIM to deploy the to-be-accelerated VNF onto a target host in a management domain of the target VIM.

407. The NFVO sends the first request information to the target VIM.

After receiving the first request information, the target VIM may deploy the to-be-accelerated VNF onto the target host in the management domain of the target VIM.

Step 406 and step 407 are steps by which the NFVO deploys the to-be-accelerated VNF onto the target host by using the target VIM. It should be noted that, step 406 and step 407 are an example for description, and the present invention is not limited thereto. Another deployment manner may also be used, such as the following step 408 and step 409.

408. The NFVO generates first indication information.

The first indication information is used to indicate the target VIM to a virtualized network function manager VNFM, so that the VNFM can determine the target VIM according to the first indication information, and deploy the to-be-accelerated VNF.

409. The NFVO sends the first indication information to a virtualized network function manager VNFM.

The first indication information is used to make the VNFM send a second request message to the target VIM, where the second request information is used to make the target VIM deploy the to-be-accelerated VNF onto the target host in the management domain of the target VIM.

In this embodiment, in a process of deploying the to-be-accelerated VNF onto the host, the NFVO determines that the target VIM is a VIM corresponding to the target host, and that the target host is a host corresponding to the size of the target hardware matching resource, where the size of the target hardware matching resource is a size, sent by each VIM in the management domain of the NFVO, of a hardware matching resource of a host that is in a management domain of each VIM and that has a largest hardware matching resource, so that the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 6:
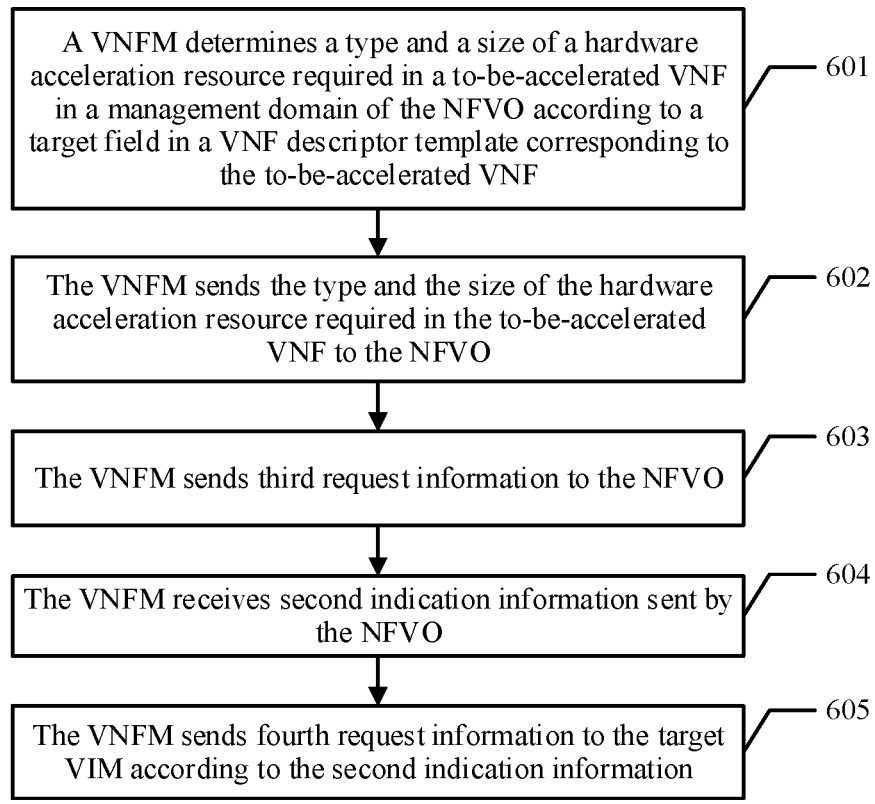
FIG. 6 is a flowchart of steps of another embodiment of a hardware acceleration method according to an embodiment of the present invention.

In the following, an implementation manner in which the functional entity specifically determines the target VIM is described in detail with reference to FIG. 6. It should be noted that, the following description of how to determine the target VIM is an example, and the present invention is not limited thereto provided that the to-be-accelerated VNF can be deployed onto the target host.

In this embodiment, reference may be made to FIG. 5 for a specific structure of the network functions virtualization architecture, and this embodiment is described by assuming that the functional entity is a virtualized network function manager VNFM.

601. A VNFM determines a type and a size of a hardware acceleration resource required in a to-be-accelerated VNF in a management domain of the NFVO according to a target field in a VNF descriptor template corresponding to the to-be-accelerated VNF.

Specifically, as shown in FIG. 5, the VNFM acquires, by reading a VNFD template in a VNF catalog, the type and the size of the hardware acceleration resource required in the to-be-accelerated VNF that requires hardware acceleration in the management domain of the NFVO.

Deployment and operation behaviors for each VNF are described by using a VNFD template and stored in a VNF catalog, and a VNFD and a VNF are in a one-to-one correspondence. Therefore, in this embodiment, the VNFM can acquire, by reading a VNFD corresponding to the to-be-accelerated VNF that requires hardware acceleration, the type and the size of the hardware acceleration resource required in the to-be-accelerated VNF that requires hardware acceleration.

A target field vdu is set in the VNFD template in the VNF catalog, so that the VNFM can determine the type and the size of the hardware acceleration resource required in the to-be-accelerated VNF in the management domain of the NFVO according to the target field in the VNF descriptor template corresponding to the to-be-accelerated VNF.

For a specific setting manner of the target field, refer to Table 1 and Table 2. Details are not described in this embodiment again.

602. The VNFM sends the type and the size of the hardware acceleration resource required in the to-be-accelerated VNF to the NFVO.

The VNFM sends the type and the size, acquired by reading the target field, of the hardware acceleration resource required in the to-be-accelerated VNF to the NFVO.

603. The VNFM sends third request information to the NFVO.

The third request information is used to make the NFVO determine a target VIM according to the third request information and the type and the size of the hardware acceleration resource required in the to-be-accelerated VNF.

Figure 4:
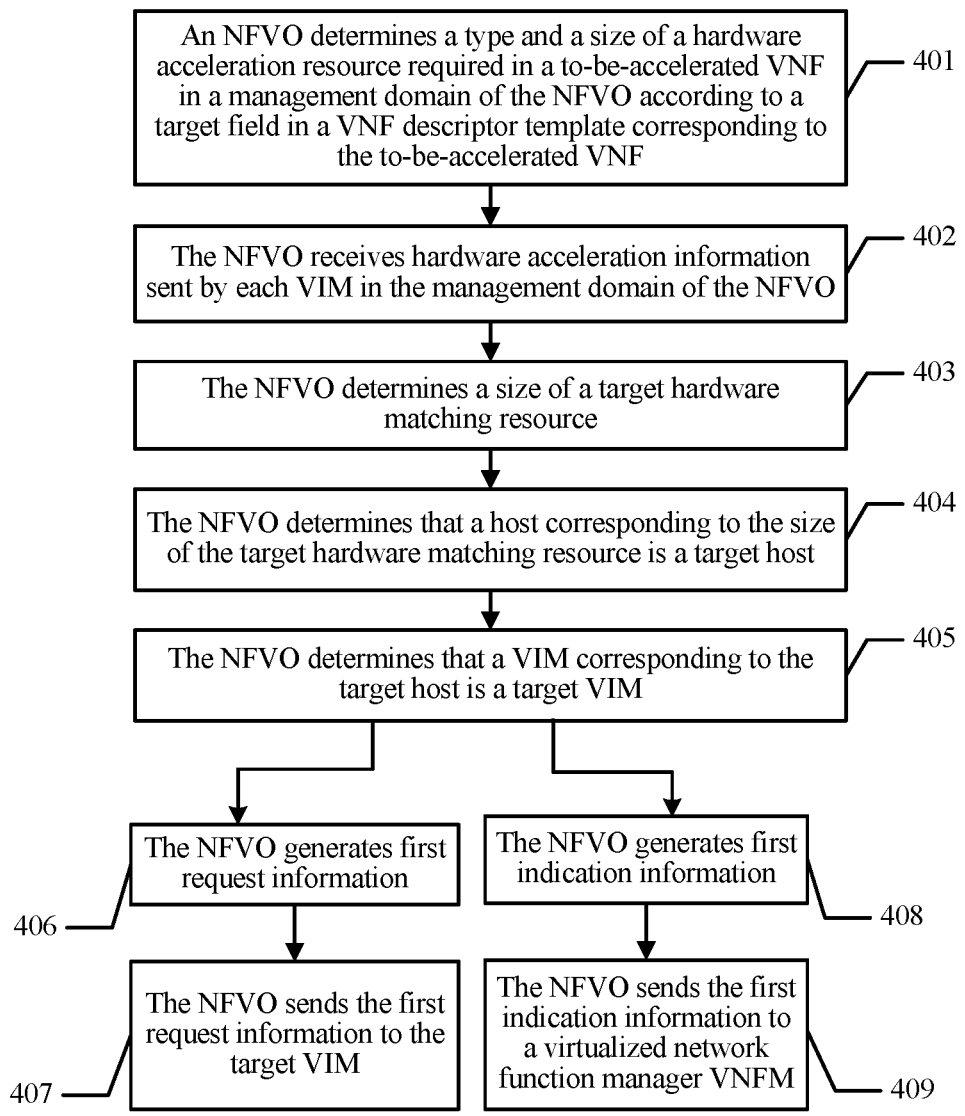
FIG. 4 is a flowchart of steps of another embodiment of a hardware acceleration method according to an embodiment of the present invention.

For a specific process in which the NFVO determines the target VIM, refer to step 402 to step 405 shown in FIG. 4. Details are not described in this embodiment again.

604. The VNFM receives second indication information sent by the NFVO.

The NFVO generates the second indication information according to the determined target VIM, where the second indication information is used to indicate the target VIM.

605. The VNFM sends fourth request information to the target VIM according to the second indication information.

The fourth request information is used to make the target VIM deploy the to-be-accelerated VNF onto the target host in the management domain of the target VIM.

According to the hardware acceleration method illustrated in this embodiment, the type of the hardware acceleration resource required in the to-be-accelerated VNF can match a type of a hardware matching resource of the target host, and a size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

The foregoing describes how to implement the hardware acceleration method of the present invention in detail from a perspective of a functional entity, and in the following, how to implement the hardware acceleration method of the present invention is described in detail from a perspective of a virtualized infrastructure manager VIM.

Figure 7:
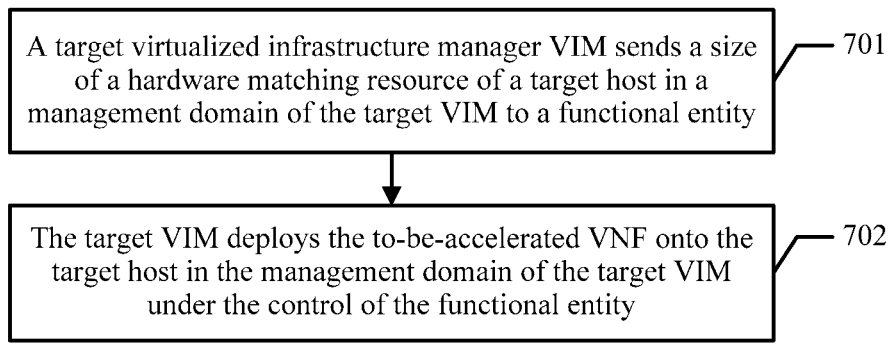
FIG. 7 is a flowchart of steps of an embodiment of a hardware acceleration method according to an embodiment of the present invention.

In the following, another embodiment of the hardware acceleration method is described in detail with reference to FIG. 7.

For a network functions virtualization architecture that can implement the hardware acceleration method illustrated in this embodiment, refer to FIG. 3. For specific description of the network functions virtualization architecture shown in FIG. 3, refer to the foregoing embodiment. Details are not described in this embodiment again.

701. A target virtualized infrastructure manager VIM sends a size of a hardware matching resource of a target host in a management domain of the target VIM to a functional entity.

The target VIM is a VIM that is in multiple VIMs in a management domain of the functional entity and that meets a preset condition.

The preset condition is that the target host exists in the management domain of the target VIM.

The functional entity determines the target VIM according to the size of the hardware matching resource of the target host.

In addition, the functional entity is further configured to determine a type and a size of a required hardware acceleration resource in a to-be-accelerated virtualized network function VNF in the management domain of the functional entity.

Figure 1:
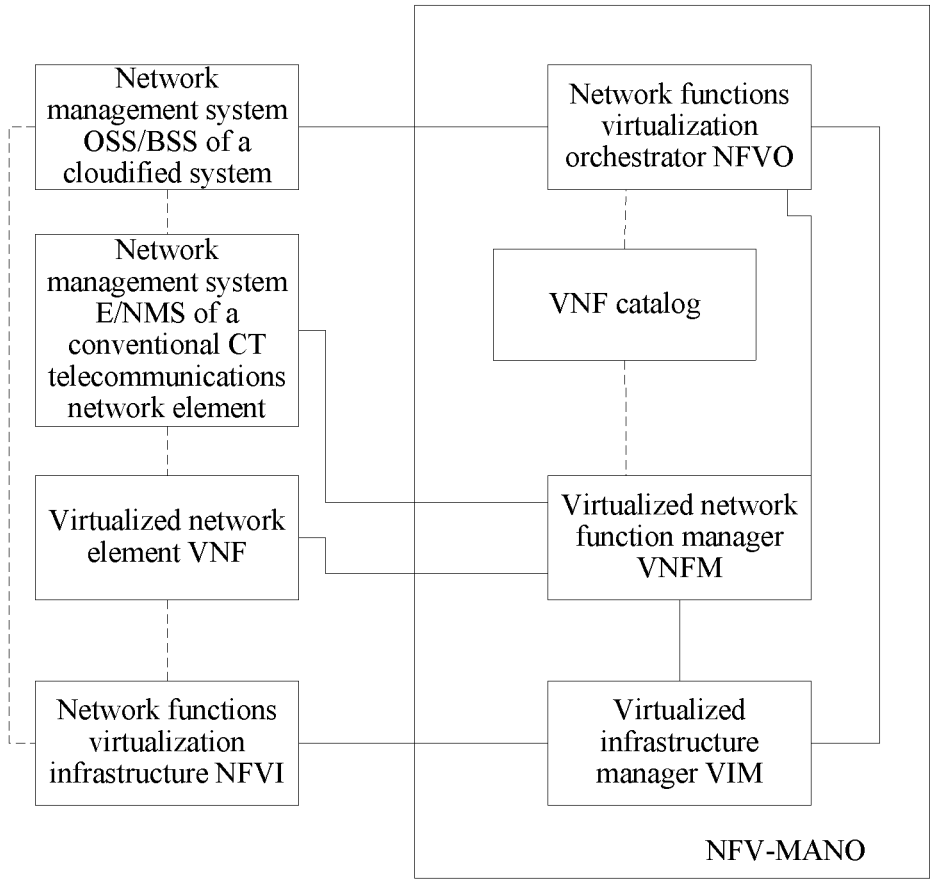
FIG. 1 is a schematic structural diagram of a network functions virtualization architecture in the prior art.
Figure 2:
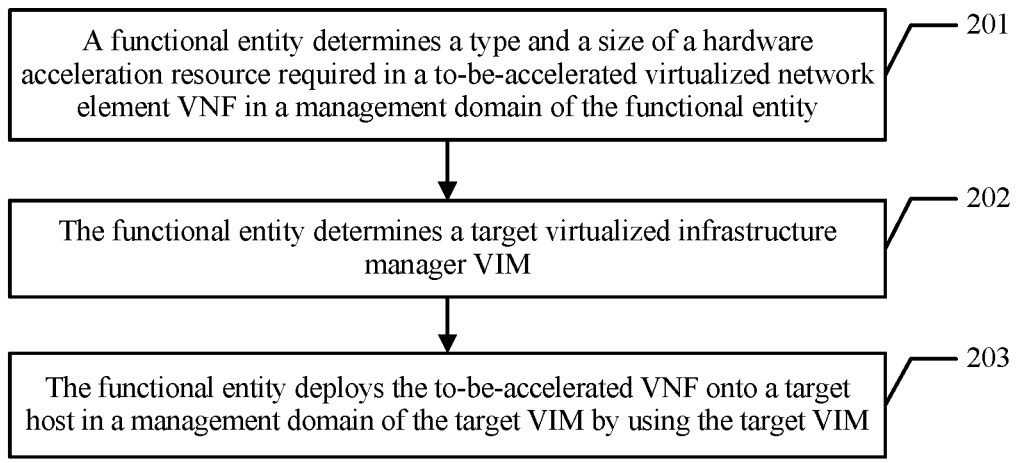
FIG. 2 is a flowchart of steps of an embodiment of a hardware acceleration method according to an embodiment of the present invention.

For details about how the functional entity specifically determines the type and the size of the required hardware acceleration resource in the to-be-accelerated virtualized network function VNF in the management domain of the functional entity, refer to the embodiment shown in FIG. 2. Details are not described in this embodiment again.

702. The target VIM deploys a to-be-accelerated VNF onto the target host in the management domain of the target VIM under the control of the functional entity.

The size of the hardware matching resource of the target host in the management domain of the target VIM is greater than the size of the hardware acceleration resource required in the to-be-accelerated VNF, and a type of the hardware matching resource is consistent with the type of the required hardware acceleration resource.

In this embodiment, the target VIM sends the size of the hardware matching resource of the target host in the management domain of the target VIM to the functional entity, so that the functional entity can determine the target VIM, and the target VIM can deploy the to-be-accelerated VNF onto the target host in the management domain of the target VIM under the control of the functional entity. In addition, in a process in which the target VIM deploys the to-be-accelerated VNF onto the target host in the management domain of the target VIM, deployment is not performed sequentially or randomly, but the to-be-accelerated VNF is deployed onto the target host whose hardware matching resource has a greater size than the size of the hardware acceleration resource required in the to-be-accelerated VNF, and the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

In the following, how the target VIM implements the hardware acceleration method, wherein the functional entity is a network functions virtualization orchestrator NFVO is described with reference to FIG. 8.

For a specific structure of a network functions virtualization architecture for implementing the hardware acceleration method illustrated in this embodiment, refer to FIG. 5. For specific description of the network functions virtualization architecture shown in FIG. 5, refer to the foregoing embodiment. Details are not described in this embodiment again.

801. A target VIM sends hardware acceleration information to an NFVO.

The hardware acceleration information includes a reported hardware matching resource size, and the reported hardware matching resource size is a size of a hardware matching resource of a target host that is in the management domain of the target VIM and that has a largest hardware matching resource.

That is, each VIM in a management domain of the NFVO sends hardware acceleration information, where the hardware acceleration information includes a reported hardware matching resource size, and the reported hardware matching resource size is a size of a hardware matching resource of a host that is in a management domain of each VIM and that has a largest hardware matching resource.

The NFVO is configured to determine a size of a target hardware matching resource according to the hardware acceleration information, where the size of the target hardware matching resource is a maximum value in the reported hardware matching resource sizes of the VIMs in the management domain of the NFVO, so that the NFVO determines that a host corresponding to the size of the target hardware matching resource is the target host, and the NFVO determines that a VIM corresponding to the target host is the target VIM.

In this embodiment, that the target VIM is a VIM that is in the management domain of the NFVO and that has a maximum value in the reported hardware matching resource sizes is an example of determining the target VIM, and the present invention is not limited thereto. Another manner of determining the target VIM may also be used provided that a type of a hardware acceleration resource required in a to-be-accelerated VNF can match a type of the hardware matching resource of the target host and the size of the hardware matching resource of the target host is greater than a size of the hardware acceleration resource required in the to-be-accelerated VNF.

802. The target VIM receives first request information sent by the NFVO.

803. The target VIM deploys a to-be-accelerated VNF onto a target host in a management domain of the target VIM according to the first request information.

Step 802 and step 803 are steps by which the target VIM deploys the to-be-accelerated VNF onto the target host. It should be noted that, step 802 and step 803 are an example for description, and the present invention is not limited thereto. Another deployment manner may also be used, such as the following step 804 and step 805.

804. The target VIM receives a second request message sent by a virtualized network function manager VNFM.

The VNFM is configured to receive first indication information sent by the NFVO, and the first indication information is used to make the VNFM send the second request message to the target VIM.

805. The target VIM deploys a to-be-accelerated VNF onto a target host in a management domain of the target VIM according to the second request message.

In this embodiment, the target VIM sends hardware acceleration information to the NFVO, so that in a process of deploying the to-be-accelerated VNF onto the host, the NFVO determines that the target VIM is a VIM corresponding to the target host, and that the target host is a host corresponding to the size of the target hardware matching resource, where the size of the target hardware matching resource is a size, sent by each VIM in the management domain of the NFVO, of a hardware matching resource of a host that is in a management domain of each VIM and that has a largest hardware matching resource, so that the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 9:
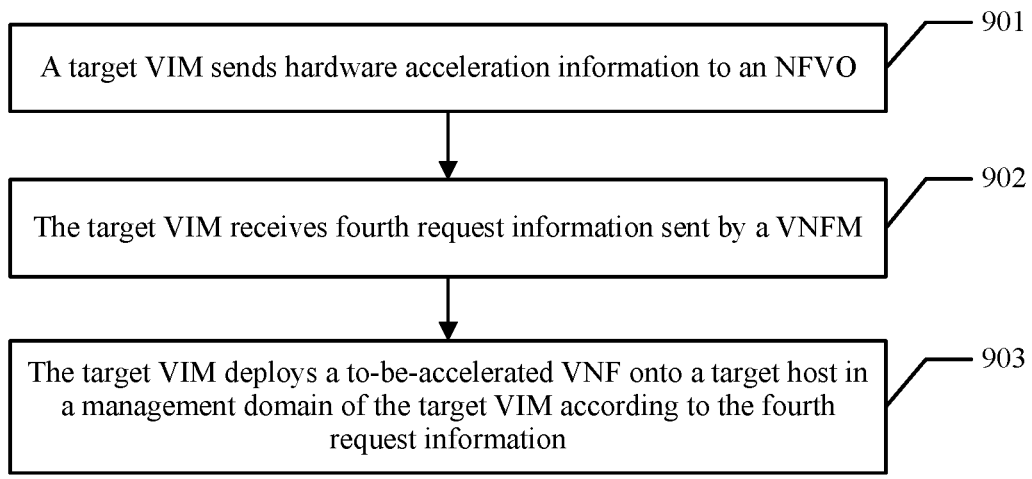
FIG. 9 is a flowchart of steps of another embodiment of a hardware acceleration method according to an embodiment of the present invention.

In the following, how the target VIM implements the hardware acceleration method, wherein the functional entity is a virtualized network function manager VNFM is described with reference to FIG. 9.

For a specific structure of a network functions virtualization architecture for implementing the hardware acceleration method illustrated in this embodiment, refer to FIG. 5. For specific description of the network functions virtualization architecture shown in FIG. 5, refer to the foregoing embodiment. Details are not described in this embodiment again.

901. A target VIM sends hardware acceleration information to an NFVO.

Figure 8:
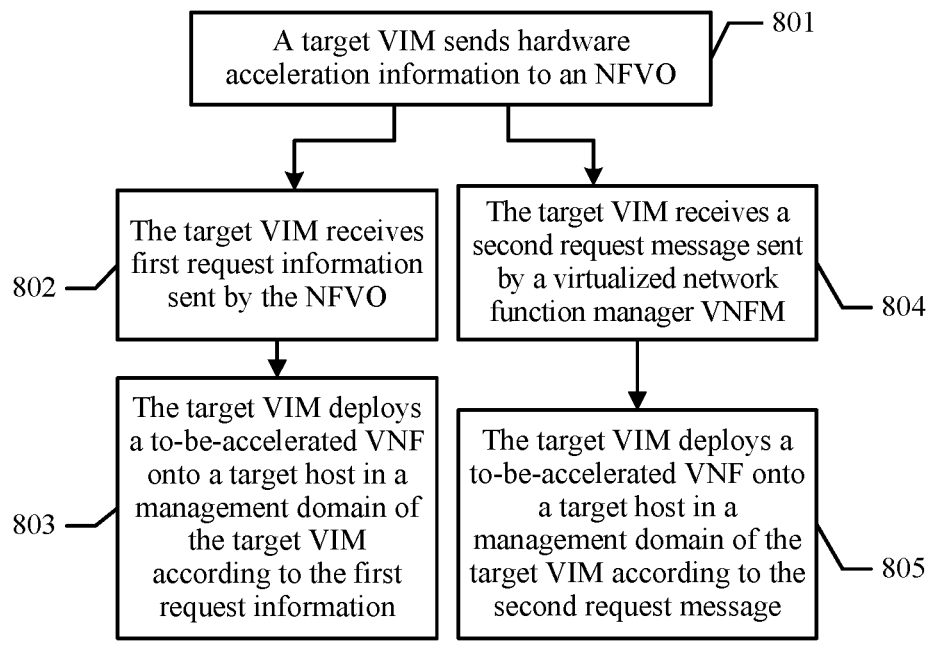
FIG. 8 is a flowchart of steps of another embodiment of a hardware acceleration method according to an embodiment of the present invention.

For details about step 901 in this embodiment, refer to step 801 shown in FIG. 8. Details are not described in this embodiment again.

902. The target VIM receives fourth request information sent by a VNFM.

The VNFM is configured to send the fourth request information to the target VIM according to second indication information, and the VNFM is further configured to receive the second indication information sent by the NFVO, where the second indication information is used to indicate the target VIM.

903. The target VIM deploys a to-be-accelerated VNF onto a target host in a management domain of the target VIM according to the fourth request information.

According to the hardware acceleration method illustrated in this embodiment, a type of a hardware acceleration resource required in the to-be-accelerated VNF can match a type of a hardware matching resource of the target host, and a size of the hardware matching resource of the target host is greater than a size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 10:
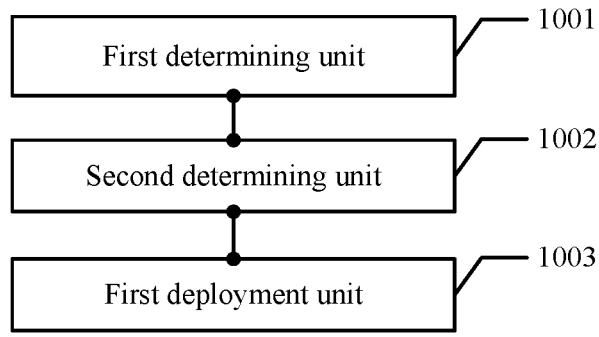
FIG. 10 is a schematic structural diagram of an embodiment of a functional entity according to an embodiment of the present invention.

In the following, a structure of a functional entity that can enable an acceleration resource of a host in which a VNF is located to meet an acceleration requirement of the VNF is described in detail with reference to FIG. 10.

The functional entity includes a first determining unit 1001, a second determining unit 1002, and a first deployment unit 1003.

The first determining unit 1001 is configured to determine a type and a size of a required hardware acceleration resource in a to-be-accelerated virtualized network function VNF in a management domain of the functional entity.

For a structure of a network functions virtualization architecture provided in this embodiment, refer to FIG. 3. A specific implementation structure of the functional entity is not limited in this embodiment.

For specific description of the network functions virtualization architecture shown in FIG. 3, refer to the foregoing embodiment. Details are not described in this embodiment again.

The second determining unit 1002 is configured to determine a target virtualized infrastructure manager VIM.

The functional entity determines that a VIM, in multiple VIMs in the management domain of the functional entity, that meets a preset condition is the target VIM, so that the target VIM determines a target host in a management domain of the target VIM.

The preset condition is that the target host exists in the management domain of the target VIM.

Specifically, a size of a hardware matching resource of the target host is greater than the size of the hardware acceleration resource required in the to-be-accelerated VNF.

More specifically, a type of the hardware matching resource is consistent with the type of the required hardware acceleration resource.

The first deployment unit 1003 is configured to deploy the to-be-accelerated VNF onto a target host in a management domain of the target VIM by using the target VIM, where the size of the hardware matching resource of the target host is greater than the size of the hardware acceleration resource required in the to-be-accelerated VNF, and a type of the hardware matching resource is consistent with the type of the required hardware acceleration resource.

In this embodiment, in a process in which the functional entity deploys the to-be-accelerated VNF onto the host, deployment is not performed sequentially or randomly, but the functional entity deploys the to-be-accelerated VNF onto the target host whose hardware matching resource has a greater size than the size of the hardware acceleration resource required in the to-be-accelerated VNF, and the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 11:
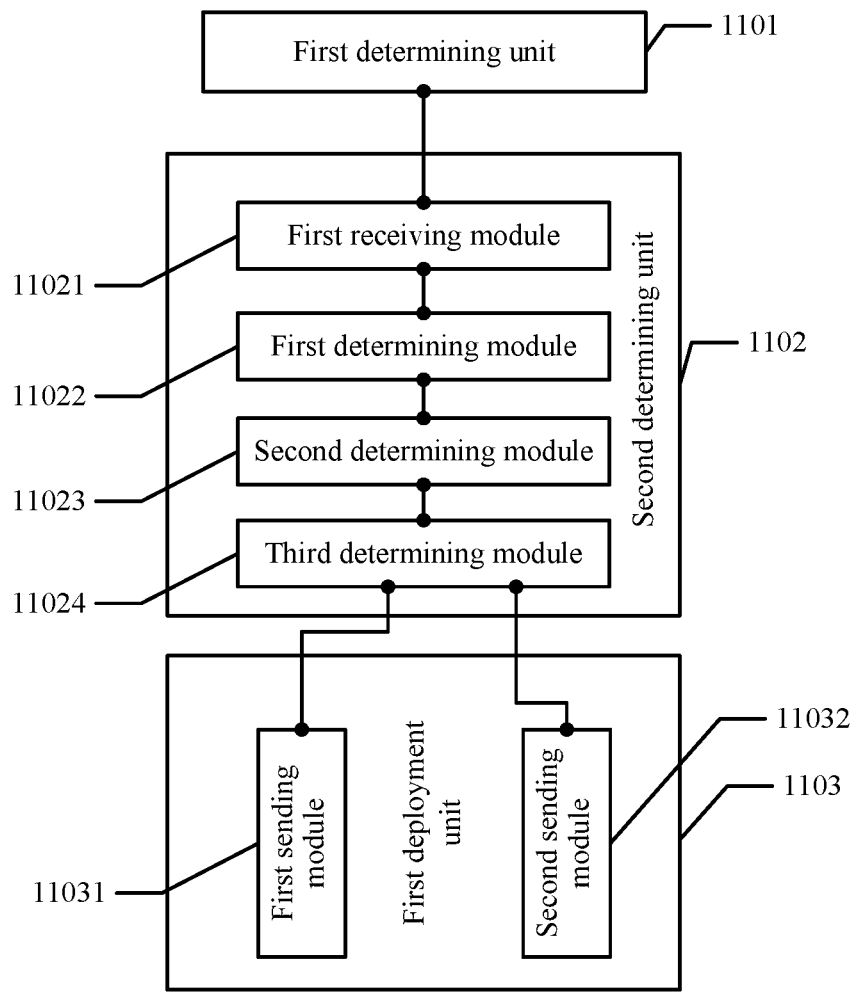
FIG. 11 is a schematic structural diagram of another embodiment of a functional entity according to an embodiment of the present invention.

In the following, a structure of a functional entity that can determine a target VIM is described in detail with reference to FIG. 11.

In this embodiment, reference may be made to FIG. 5 for a specific structure of the network functions virtualization architecture, and this embodiment is described by assuming that the functional entity is a network functions virtualization orchestrator NFVO.

The functional entity includes a first determining unit 1101, a second determining unit 1102, and a first deployment unit 1103.

The first determining unit 1101 is configured to determine a type and a size of a hardware acceleration resource required in a to-be-accelerated VNF in a management domain of the NFVO according to a target field in a VNF descriptor template corresponding to the to-be-accelerated VNF.

Specifically, as shown in FIG. 5, the NFVO acquires, by reading a VNFD template in a VNF catalog, the type and the size of the hardware acceleration resource required in the to-be-accelerated VNF that requires hardware acceleration in the management domain of the NFVO.

For details about how the NFVO specifically acquires the type and the size of the hardware acceleration resource required in the to-be-accelerated VNF that requires hardware acceleration in the management domain of the NFVO, refer to the foregoing embodiment. Details are not described in this embodiment again.

The second determining unit 1102 is configured to determine a target virtualized infrastructure manager VIM.

Specifically, the second determining unit 1102 further includes:

a first receiving module 11021, configured to receive hardware acceleration information sent by each VIM in the management domain of the NFVO, where the hardware acceleration information includes a reported hardware matching resource size, and the reported hardware matching resource size is a size of a hardware matching resource of a host that is in a management domain of each VIM and that has a largest hardware matching resource;

a first determining module 11022, configured to determine a size of a target hardware matching resource, where the size of the target hardware matching resource is a maximum value in the reported hardware matching resource sizes;

a second determining module 11023, configured to determine that a host corresponding to the size of the target hardware matching resource is a target host; and a third determining module 11024, configured to determine that a VIM corresponding to the target host is the target VIM.

The first deployment unit 1103 is configured to deploy the to-be-accelerated VNF onto the target host in a management domain of the target VIM by using the target VIM, where a size of a hardware matching resource of the target host is greater than the size of the hardware acceleration resource required in the to-be-accelerated VNF, and a type of the hardware matching resource is consistent with the type of the required hardware acceleration resource.

Specifically, the first deployment unit 1103 includes:

a first sending module 11031, configured to send first request information to the target VIM, where the first request information is used to make the target VIM deploy the to-be-accelerated VNF onto the target host in the management domain of the target VIM;

or, the first deployment unit 1103 includes:

a second sending module 11032, configured to send first indication information to a virtualized network function manager VNFM, where the first indication information is used to make the VNFM send a second request message to the target VIM, and the second request information is used to make the target VIM deploy the to-be-accelerated VNF onto the target host in the management domain of the target VIM.

In this embodiment, in a process of deploying the to-be-accelerated VNF onto the host, the NFVO determines that the target VIM is a VIM corresponding to the target host, and that the target host is a host corresponding to the size of the target hardware matching resource, where the size of the target hardware matching resource is a size, sent by each VIM in the management domain of the NFVO, of a hardware matching resource of a host that is in a management domain of each VIM and that has a largest hardware matching resource, so that the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 12:
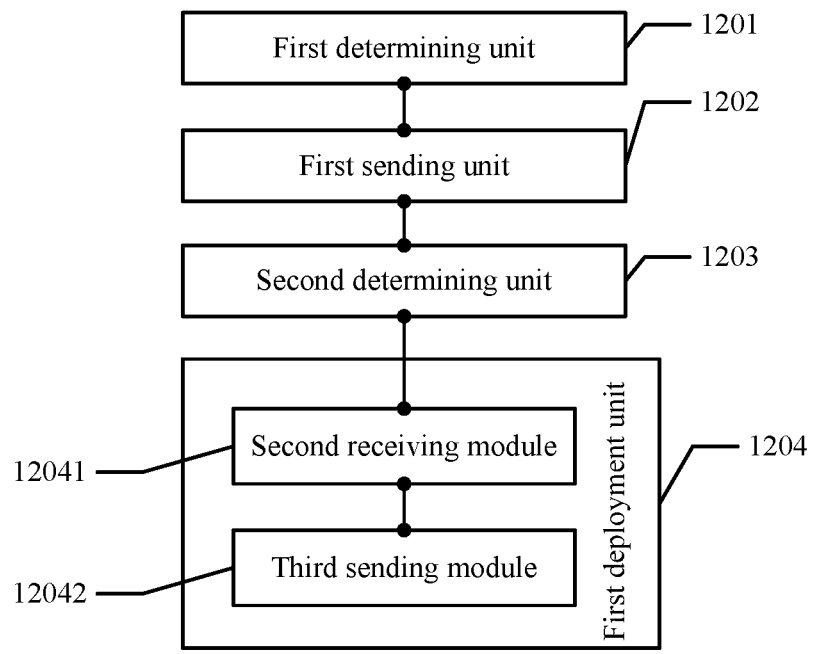
FIG. 12 is a schematic structural diagram of another embodiment of a functional entity according to an embodiment of the present invention.

In the following, a structure of a functional entity that can determine a target VIM is described in detail with reference to FIG. 12.

In this embodiment, reference may be made to FIG. 5 for a specific structure of the network functions virtualization architecture, and this embodiment is described by assuming that the functional entity is a virtualized network function manager VNFM.

The functional entity includes a first determining unit 1201, a first sending unit 1202, a second determining unit 1203, and a first deployment unit 1204.

The first determining unit 1201 is configured to determine a type and a size of a hardware acceleration resource required in a to-be-accelerated VNF in a management domain of the NFVO according to a target field in a VNF descriptor template corresponding to the to-be-accelerated VNF.

For details about how the VNFM specifically acquires, by reading a VNFD template in a VNF catalog, the type and the size of the hardware acceleration resource required in the to-be-accelerated VNF that requires hardware acceleration in the management domain of the NFVO, refer to the foregoing embodiment. Details are not described in this embodiment again.

The first sending unit 1202 is configured to send the type and the size of the hardware acceleration resource required in the to-be-accelerated VNF to the NFVO.

The second determining unit 1203 is configured to determine a target virtualized infrastructure manager VIM.

The second determining unit 1203 is further configured to send third request information to the NFVO, so that the NFVO determines the target VIM according to the third request information and the type and the size of the hardware acceleration resource required in the to-be-accelerated VNF.

The first deployment unit 1204 is configured to deploy the to-be-accelerated VNF onto a target host in a management domain of the target VIM by using the target VIM, where a size of a hardware matching resource of the target host is greater than the size of the hardware acceleration resource required in the to-be-accelerated VNF, and a type of the hardware matching resource is consistent with the type of the required hardware acceleration resource.

Specifically, the first deployment unit 1204 includes:

a second receiving module 12041, configured to receive second indication information sent by the NFVO, where the second indication information is used to indicate the target VIM; and a third sending module 12042, configured to send fourth request information to the target VIM according to the second indication information, where the fourth request information is used to make the target VIM deploy the to-be-accelerated VNF onto the target host in the management domain of the target VIM.

According to this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 13:
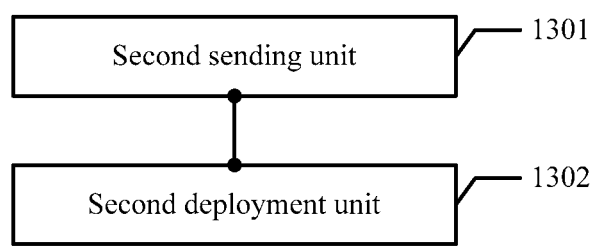
FIG. 13 is a schematic structural diagram of an embodiment of a target VIM according to an embodiment of the present invention.

In the following, a structure of a target VIM that can enable an acceleration resource of a host in which a VNF is located to meet an acceleration requirement of the VNF is described in detail with reference to FIG. 13.

For a network functions virtualization architecture that can implement the hardware acceleration method illustrated in this embodiment, refer to FIG. 3. For specific description of the network functions virtualization architecture shown in FIG. 3, refer to the foregoing embodiment. Details are not described in this embodiment again.

The target virtualized infrastructure manager VIM includes:

a second sending unit 1301, configured to send a size of a hardware matching resource of a target host in a management domain of the target VIM to a functional entity, so that the functional entity determines the target VIM according to the size of the hardware matching resource of the target host, where, in addition, the functional entity is further configured to determine a type and a size of a required hardware acceleration resource in a to-be-accelerated virtualized network function VNF in a management domain of the functional entity; and a second deployment unit 1302, configured to deploy the to-be-accelerated VNF onto the target host in the management domain of the target VIM under the control of the functional entity, where the size of the hardware matching resource of the target host is greater than the size of the hardware acceleration resource required in the to-be-accelerated VNF, and a type of the hardware matching resource is consistent with the type of the required hardware acceleration resource.

In this embodiment, the target VIM sends the size of the hardware matching resource of the target host in the management domain of the target VIM to the functional entity, so that the functional entity can determine the target VIM, and the target VIM can deploy the to-be-accelerated VNF onto the target host in the management domain of the target VIM under the control of the functional entity. In addition, in a process in which the target VIM deploys the to-be-accelerated VNF onto the target host in the management domain of the target VIM, deployment is not performed sequentially or randomly, but the to-be-accelerated VNF is deployed onto the target host whose hardware matching resource has a greater size than the size of the hardware acceleration resource required in the to-be-accelerated VNF, and the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 14:
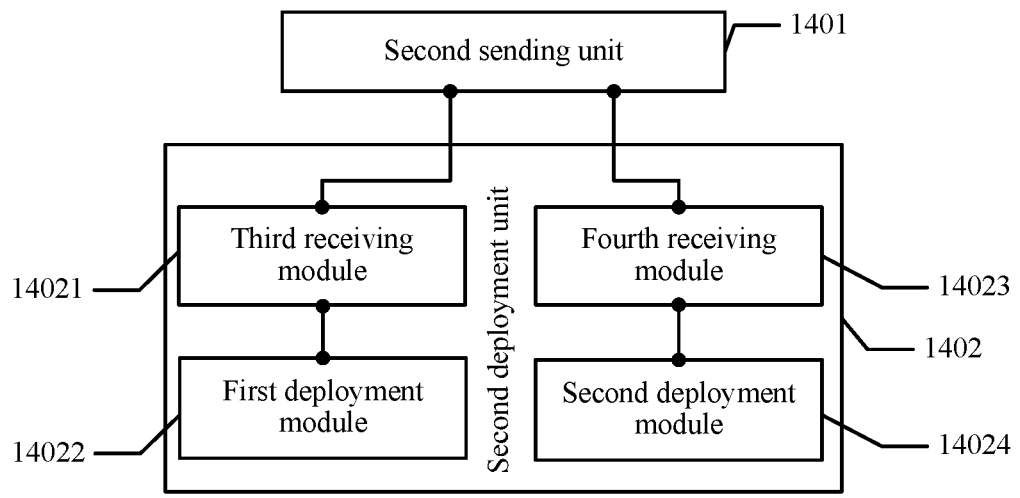
FIG. 14 is a schematic structural diagram of another embodiment of a target VIM according to an embodiment of the present invention.

In the following, a specific structure of the target VIM is described with reference to FIG. 14 when the functional entity is a network functions virtualization orchestrator NFVO.

For a specific structure for implementing a network functions virtualization architecture shown in this embodiment, refer to FIG. 5. For specific description of the network functions virtualization architecture shown in FIG. 5, refer to the foregoing embodiment. Details are not described in this embodiment again.

The target VIM includes:

a second sending unit 1401, configured to send hardware acceleration information to the NFVO, where the hardware acceleration information includes a reported hardware matching resource size, and the reported hardware matching resource size is a size of a hardware matching resource of a target host that is in a management domain of a target VIM and that has a largest hardware matching resource, so that the NFVO determines a size of a target hardware matching resource according to the hardware acceleration information, where the size of the target hardware matching resource is a maximum value in reported hardware matching resource sizes of VIMs in a management domain of the NFVO, so that the NFVO determines that a host corresponding to the size of the target hardware matching resource is the target host, and the NFVO determines that a VIM corresponding to the target host is the target VIM;

a second deployment unit 1402, configured to deploy a to-be-accelerated VNF onto the target host in the management domain of the target VIM under the control of the functional entity, where the size of the hardware matching resource of the target host is greater than a size of a hardware acceleration resource required in the to-be-accelerated VNF, and a type of the hardware matching resource is consistent with a type of the required hardware acceleration resource.

Specifically, the second deployment unit 1402 includes:

a third receiving module 14021, configured to receive first request information sent by the NFVO; and a first deployment module 14022, configured to deploy the to-be-accelerated VNF onto the target host in the management domain of the target VIM according to the first request information;

or a fourth receiving module 14023, configured to receive a second request message sent by a virtualized network function manager VNFM, where the VNFM is configured to receive first indication information sent by the NFVO, and the first indication information is used to make the VNFM send the second request message to the target VIM; and a second deployment module 14024, configured to deploy the to-be-accelerated VNF onto the target host in the management domain of the target VIM according to the second request message.

In this embodiment, the target VIM sends hardware acceleration information to the NFVO, so that in a process of deploying the to-be-accelerated VNF onto the host, the NFVO determines that the target VIM is a VIM corresponding to the target host, and that the target host is a host corresponding to the size of the target hardware matching resource, where the size of the target hardware matching resource is a size, sent by each VIM in the management domain of the NFVO, of a hardware matching resource of a host that is in a management domain of each VIM and that has a largest hardware matching resource, so that the type of the hardware matching resource of the target host is consistent with the type of the required hardware acceleration resource. Therefore, according to the hardware acceleration method illustrated in this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

Figure 15:
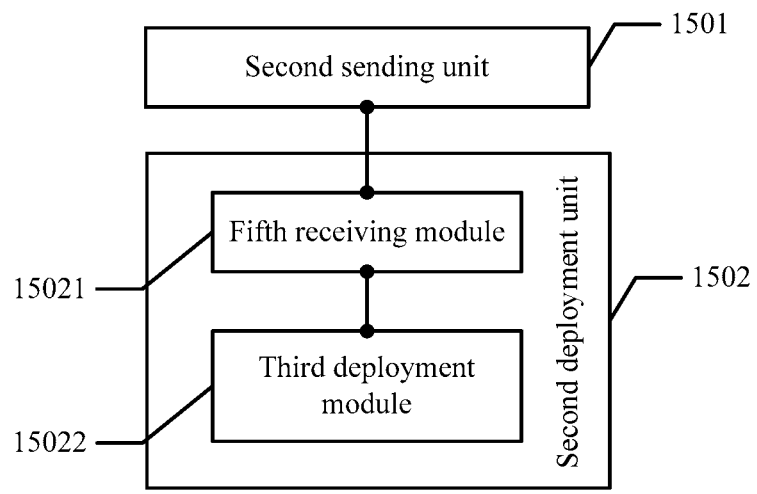
FIG. 15 is a schematic structural diagram of another embodiment of a target VIM according to an embodiment of the present invention.

In the following, a specific structure of the target VIM is described with reference to FIG. 15 when the functional entity is a virtualized network function manager VNFM.

The target virtualized infrastructure manager VIM includes:

a second sending unit 1501, configured to send a size of a hardware matching resource of a target host in a management domain of the target VIM to a functional entity, so that the functional entity determines the target VIM according to the size of the hardware matching resource of the target host, where, in addition, the functional entity is further configured to determine a type and a size of a required hardware acceleration resource in a to-be-accelerated virtualized network function VNF in a management domain of the functional entity; and a second deployment unit 1502, configured to deploy the to-be-accelerated VNF onto the target host in the management domain of the target VIM under the control of the functional entity, where the size of the hardware matching resource of the target host is greater than the size of the hardware acceleration resource required in the to-be-accelerated VNF, and a type of the hardware matching resource is consistent with the type of the required hardware acceleration resource.

Specifically, the second deployment unit 1502 includes:

a fifth receiving module 15021, configured to receive fourth request information sent by the VNFM, where the VNFM is configured to send the fourth request information to the target VIM according to second indication information, the VNFM is further configured to receive the second indication information sent by the NFVO, and the second indication information is used to indicate the target VIM; and a third deployment module 15022, configured to deploy the to-be-accelerated VNF onto the target host in the management domain of the target VIM according to the fourth request information.

According to this embodiment, the type of the hardware acceleration resource required in the to-be-accelerated VNF can match the type of the hardware matching resource of the target host, and the size of the hardware matching resource of the target host is greater than the size of the hardware acceleration resource required in the to-be-accelerated VNF, so that the hardware matching resource of the target host can meet an acceleration requirement of the to-be-accelerated VNF, thereby effectively improving performance of the to-be-accelerated VNF.

In the following, a structure of a functional entity that can enable an acceleration resource of a host in which a VNF is located to meet an acceleration requirement of the VNF is described in detail from a perspective of hardware.

Figure 16:
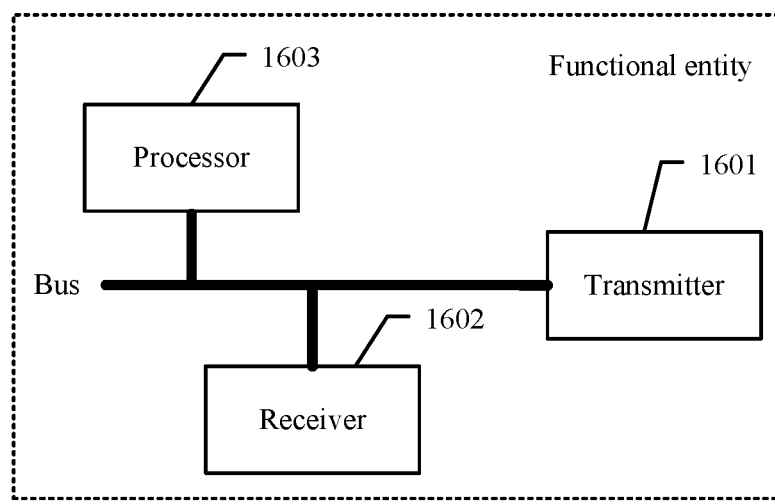
FIG. 16 is a schematic structural diagram of another embodiment of a functional entity according to an embodiment of the present invention.

As shown in FIG. 16, the functional entity includes: a transmitter 1601, a receiver 1602, and a processor 1603.

The processor 1603 is configured to perform the following operations:

determining a type and a size of a required hardware acceleration resource in a to-be-accelerated virtualized network function VNF in a management domain of the functional entity;

determining a target virtualized infrastructure manager VIM; and deploying the to-be-accelerated VNF onto a target host in a management domain of the target VIM by using the target VIM, where a size of a hardware matching resource of the target host is greater than the size of the hardware acceleration resource required in the to-be-accelerated VNF, and a type of the hardware matching resource is consistent with the type of the required hardware acceleration resource.

Further, wherein the functional entity is a network functions virtualization orchestrator NFVO, the processor 1603 is further configured to perform the following operation:

determining a type and a size of a hardware acceleration resource required in a to-be-accelerated VNF in a management domain of the NFVO according to a target field in a VNF descriptor template corresponding to the to-be-accelerated VNF.

Further, the receiver 1602 is configured to perform the following operation:

receiving hardware acceleration information sent by each VIM in the management domain of the NFVO, where the hardware acceleration information includes a reported hardware matching resource size, and the reported hardware matching resource size is a size of a hardware matching resource of a host that is in a management domain of each VIM and that has a largest hardware matching resource.

The processor 1603 is further configured to perform the following operations:

determining a size of a target hardware matching resource, where the size of the target hardware matching resource is a maximum value in the reported hardware matching resource sizes;

determining that a host corresponding to the size of the target hardware matching resource is the target host; and determining that a VIM corresponding to the target host is the target VIM.

Further, the transmitter 1601 is configured to perform the following operation:

sending first request information to the target VIM, where the first request information is used to make the target VIM deploy the to-be-accelerated VNF onto the target host in the management domain of the target VIM;

or sending first indication information to a virtualized network function manager VNFM, where the first indication information is used to make the VNFM send a second request message to the target VIM, and the second request information is used to make the target VIM deploy the to-be-accelerated VNF onto the target host in the management domain of the target VIM.

Further, wherein the functional entity is a virtualized network function manager VNFM, the processor 1603 is further configured to perform the following operation:

determining a type and a size of a hardware acceleration resource required in a to-be-accelerated VNF in a management domain of the NFVO according to a target field in a VNF descriptor template corresponding to the to-be-accelerated VNF.

The transmitter 1601 is configured to perform the following operation:

sending the type and the size of the hardware acceleration resource required in the to-be-accelerated VNF to the NFVO.

Further, the transmitter 1601 is further configured to perform the following operation:

sending third request information to the NFVO, so that the NFVO determines the target VIM according to the third request information and the type and the size of the hardware acceleration resource required in the to-be-accelerated VNF.

The receiver 1602 is further configured to perform the following operation:

receiving second indication information sent by the NFVO, where the second indication information is used to indicate the target VIM.

The transmitter 1601 is further configured to perform the following operation:

sending fourth request information to the target VIM according to the second indication information, where the fourth request information is used to make the target VIM deploy the to-be-accelerated VNF onto the target host in the management domain of the target VIM.

In the following, a structure of a target VIM that can enable an acceleration resource of a host in which a VNF is located to meet an acceleration requirement of the VNF is described in detail from a perspective of hardware.

Figure 17:
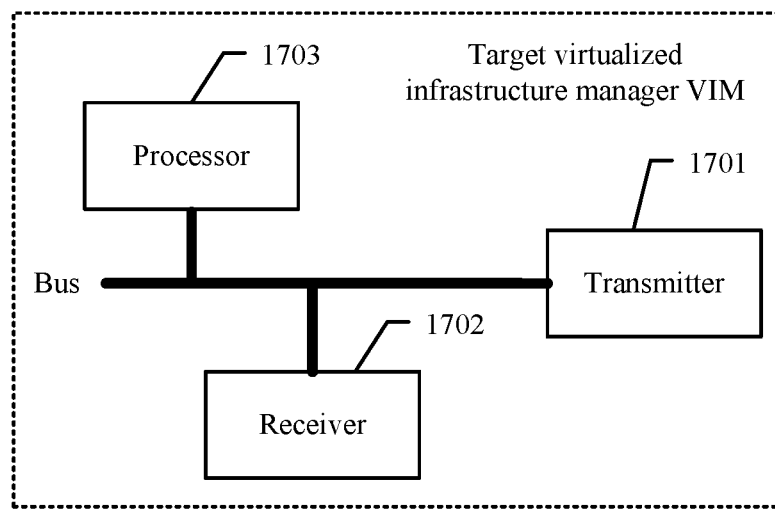
FIG. 17 is a schematic structural diagram of another embodiment of a target VIM according to an embodiment of the present invention.

As shown in FIG. 17, a target virtualized infrastructure manager VIM includes: a transmitter 1701, a receiver 1702, and a processor 1703.

The transmitter 1701 is configured to perform the following operation:

sending a size of a hardware matching resource of a target host in a management domain of the target VIM to a functional entity, so that the functional entity determines the target VIM according to the size of the hardware matching resource of the target host, where, in addition, the functional entity is further configured to determine a type and a size of a required hardware acceleration resource in a to-be-accelerated virtualized network function VNF in a management domain of the functional entity.

The processor 1703 is configured to perform the following operation:

deploying the to-be-accelerated VNF onto the target host in the management domain of the target VIM under the control of the functional entity, where the size of the hardware matching resource of the target host is greater than the size of the hardware acceleration resource required in the to-be-accelerated VNF, and a type of the hardware matching resource is consistent with the type of the required hardware acceleration resource.

Further, wherein the functional entity is a network functions virtualization orchestrator NFVO, the transmitter 1701 is further configured to perform the following operation:

sending hardware acceleration information to the NFVO, where the hardware acceleration information includes a reported hardware matching resource size, and the reported hardware matching resource size is a size of a hardware matching resource of a target host that is in the management domain of the target VIM and that has a largest hardware matching resource, so that the NFVO determines a size of a target hardware matching resource according to the hardware acceleration information, where the size of the target hardware matching resource is a maximum value in reported hardware matching resource sizes of VIMs in a management domain of the NFVO, so that the NFVO determines that a host corresponding to the size of the target hardware matching resource is the target host, and the NFVO determines that a VIM corresponding to the target host is the target VIM.

Further, the receiver 1702 is configured to perform the following operation:

receiving first request information sent by the NFVO; and the processor 1703 is configured to perform the following operation:

deploying the to-be-accelerated VNF onto the target host in the management domain of the target VIM according to the first request information;

or the receiver 1702 is further configured to perform the following operation:

receiving a second request message sent by a virtualized network function manager VNFM, where the VNFM is configured to receive first indication information sent by the NFVO, and the first indication information is used to make the VNFM send the second request message to the target VIM; and the processor 1703 is further configured to perform the following operation:

deploying the to-be-accelerated VNF onto the target host in the management domain of the target VIM according to the second request message.

Further, wherein the functional entity is a virtualized network function manager VNFM, the receiver 1702 is further configured to perform the following operation:

receiving fourth request information sent by the VNFM, where the VNFM is configured to send the fourth request information to the target VIM according to second indication information, the VNFM is further configured to receive the second indication information sent by the NFVO, and the second indication information is used to indicate the target VIM.

The processor 1703 is configured to perform the following operation:

deploying the to-be-accelerated VNF onto the target host in the management domain of the target VIM according to the fourth request information.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The foregoing embodiments are merely intended for describing the technical solutions of the present invention, but not for limiting the present invention. Although the present invention is described in detail with reference to the foregoing embodiment, persons of ordinary skill in the art should understand that they may still make modifications to the technical solutions described in the foregoing embodiment or make equivalent replacements to some technical features thereof, without departing from the spirit and scope of the technical solutions of the embodiments of the present invention.

The invention claimed is:

1. A communications system comprising a network functions virtualization orchestrator (NFVO) and a virtualized infrastructure manager (VIM), and wherein:
   the NFVO comprises a processor, and wherein the processor is configured to invoke the NFVO to: send first request information to the VIM, wherein the first request information is configured to request the VIM to deploy the to-be-accelerated VNF onto a host in a management domain of the VIM, wherein a hardware resource of the host meets a requirement of the to-be-accelerated VNF, and the requirement of the to-be-accelerated VNF includes information indicating a type of a required hardware acceleration resource and a size of the required hardware acceleration resource in the to-be-accelerated VNF; and
   the VIM comprises a processor, and wherein the processor of the VIM is configured to invoke the VIM to: receive the first request information from the NFVO; and deploy the to-be-accelerated VNF onto the host in the management domain of the VIM.

2. The communications system according to claim 1, wherein a size of the hardware resource of the host is greater than the size of the required hardware acceleration resource in the to-be-accelerated VNF, and a type of the hardware resource is consistent with the type of the required hardware acceleration resource in the to-be-accelerated VNF.

3. The communications system according to claim 1, wherein the processor of the VIM is further configured to invoke:
   the VIM to send hardware acceleration information to the NFVO, wherein the hardware acceleration information comprises information indicating a size of a hardware resource reported by the VIM, wherein the size the of the hardware resource is a size of a hardware resource of a host having a largest hardware resource in the management domain of the VIM; and
   the processor of the NFVO is further configured to invoke receiving the hardware acceleration information.

4. The communications system according to claim 3, wherein the size of the hardware resource reported by the VIM is the largest among hardware resource sizes reported by each VIM in the management domain of the NFVO.

5. A communications system comprising a virtualized network function manager (VNFM) and a virtualized infrastructure manager (VIM), and wherein:
   the VNFM comprises a processor, and wherein the processor of the VNFM is configured to invoke the VNFM to: send a second request message to a VIM, wherein the second request message is configured to cause the VIM to deploy a to-be-accelerated virtualized network function (VNF) onto a host in a management domain of the VIM, wherein a hardware resource of the host meets a requirement of the to-be-accelerated VNF, and the requirement of the to-be-accelerated VNF includes information indicating a type of a required hardware acceleration resource and a size of the required hardware acceleration resource in the to-be-accelerated VNF; and
   the VIM comprises a processor, and wherein the processor of the VIM is configured to invoke the VIM to: receive the second request message from the VNFM; and deploy the to-be-accelerated VNF onto the host in the management domain of the target VIM.

6. The communications system according to claim 5, wherein a size of the hardware resource of the host is greater than the size of the required hardware acceleration resource in the to-be-accelerated VNF, and a type of the hardware resource is consistent with the type of the required hardware acceleration resource in the to-be-accelerated VNF.

7. The communications system according to claim 5, wherein the processor of the VIM is further configured to invoke the VIM to:
   send hardware acceleration information to a NFVO, wherein the hardware acceleration information comprises information indicating a size of a hardware resource reported by the VIM, wherein the size the of the hardware resource reported by the VIM is a size of a hardware resource of a host having a largest hardware resource in the management domain of the VIM.

8. The communications system according to claim 7, wherein the size of the hardware resource reported by the VIM is the largest among hardware resource sizes reported by each VIM in the management domain of the NFVO.

9. A hardware acceleration method, comprising:
   sending, by a network functions virtualization orchestrator (NFVO), first request information to a virtualized infrastructure manager (VIM), wherein the first request information is configured to request the VIM to deploy the to-be-accelerated VNF onto a host in a management domain of the VIM, wherein a hardware resource of the host meets a requirement of the to-be-accelerated VNF, and the requirement of the to-be-accelerated VNF includes information indicating a type of a required hardware acceleration resource and a size of the required hardware acceleration resource in the to-be-accelerated VNF; and
   receiving, by the VIM, the first request information from the NFVO; and
   deploying, by the VIM, the to-be-accelerated VNF onto the host in the management domain of the VIM.

10. The hardware acceleration method according to claim 9, wherein a size of the hardware resource of the host is greater than the size of the required hardware acceleration resource in the to-be-accelerated VNF, and a type of the hardware resource is consistent with the type of the required hardware acceleration resource in the to-be-accelerated VNF.

11. The hardware acceleration method according to claim 9, wherein the method further comprises:
   sending, by the VIM, hardware acceleration information to the NFVO, wherein the hardware acceleration information comprises information indicating a size of a hardware resource reported by the VIM, wherein the size the of the hardware resource is a size of a hardware resource of a host having a largest hardware resource in the management domain of the VIM; and
   receiving, by the NFVO, the hardware acceleration information from the VIM.

12. The hardware acceleration method according to claim 11, wherein the size of the hardware resource reported by the VIM is the largest among hardware resource sizes reported by each VIM in the management domain of the NFVO.

* * * * *